(12) United States Patent
Brown et al.

(10) Patent No.: US 6,186,794 B1
(45) Date of Patent: Feb. 13, 2001

(54) APPARATUS FOR INTERACTIVE ADAPTIVE LEARNING BY AN INDIVIDUAL THROUGH AT LEAST ONE OF A STIMULI PRESENTATION DEVICE AND A USER PERCEIVABLE DISPLAY

(75) Inventors: Carolyn J. Brown; Jerry N. Zimmermann, both of Iowa City, IA (US)

(73) Assignee: Breakthrough to Literacy, Inc., Bothell, WA (US)

(\*) Notice: Under 35 U.S.C. 154(b), the term of this patent shall be extended for 0 days.

(21) Appl. No.: 08/041,541

(22) Filed: Apr. 2, 1993

(51) Int. Cl.[7] ........................................... G06K 9/00
(52) U.S. Cl. .................... 434/116; 434/118; 434/169; 434/307 A; 704/271; 340/825.19
(58) Field of Search ....................... 434/118, 156, 434/157, 167, 168, 178, 185, 236, 238, 758, 307, 308, 322, 323, 365; 364/419.01, 419.02, 419.03, 419.07, 419.08, 419.1, 419.2; 395/100, 118, 152, 275, 375, 500, 155, 161, 600, 927, 575, 425; 704/1, 2, 3, 7, 258, 260, 270, 271; 706/927; 345/302, 952, 825.25; 340/825.19, 825.22, 825.25

(56) References Cited

U.S. PATENT DOCUMENTS

| | | | |
|---|---|---|---|
| 4,622,013 | * 11/1986 | Cerchio | 395/927 X |
| 4,884,972 | * 12/1989 | Gasper | 434/169 X |
| 4,954,969 | * 9/1990 | Tsumura | 395/154 X |
| 4,964,077 | * 10/1990 | Eisen et al. | 395/275 |
| 5,002,491 | * 3/1991 | Abrahamson et al. | 434/323 X |
| 5,018,082 | * 5/1991 | Obata et al. | 434/118 |
| 5,065,317 | * 11/1991 | Hiramatsu et al. | 364/419.01 |
| 5,172,245 | * 12/1992 | Kita et al. | 395/118 X |
| 5,255,386 | * 10/1993 | Prager | 364/419.08 X |
| 5,267,154 | * 11/1993 | Takeuchi et al. | 395/152 X |

\* cited by examiner

Primary Examiner—Joe H. Cheng
(74) Attorney, Agent, or Firm—Zarley, McKee Thomte, Voorhees & Sease

(57) ABSTRACT

An interactive adaptive learning system. A collection of core stimuli consisting of at least auditory and visual symbols and information, are stored on a computer. A number of different relationships between the core stimuli are created which can then be presented as discrimination or identification tasks to the user. Different sets of stimuli are then presented succeedingly to the user and the user is requested to respond. The form of response can either be to investigate and analyze the stimuli, or attributes of the stimuli, or answer of the quarry regarding the discrimination or identification task. The system has a built in strategy for progressing the user through learning tasks. The users actions and responses in reaction to the stimuli are all recorded and analyzed. Based not only on the success rate of the user responses, but also on other characteristics of the users reaction to the stimuli, the users learning strategy is classified. This classification is then utilized to either allow the learning strategy to continue as initially set, or to dynamically adjusted to find the presently indicated level of difficulty for the user or to adapt to the users particular learning strategies or needs.

1 Claim, 46 Drawing Sheets

DO TASK

SCREEN DISPLAY, TRAINING TASKS

DISCRIMINATION TASK

"TOP LEVEL"      "ATTRIBUTE"

?=QUESTION
1=ANSWER 1
2=ANSWER 2

IDENTIFICATION TASK

```
TITLE = 1 SYL, MIXED FREQ V. 3 SYL, MIXED FREQ
SET = 1 SYL, MIXED FREQ
SET = 3 SYL, MIXED FREQ

CUP       :    DINOSAUR
MEAT      :    GORILLA

BROOM     :    CEREAL
SHOE      :    BASKETBALL

COW       :    FINGERPAINT
CHEESE    :    HULA-HOOP

DOG       :    CALENDAR
STAR      :    BANANA
```

WORD LIST

SCREEN DISPLAY FOR ATTRIBUTE - SPEECH/NONSPEECH (NONSPEECH SHOWN)
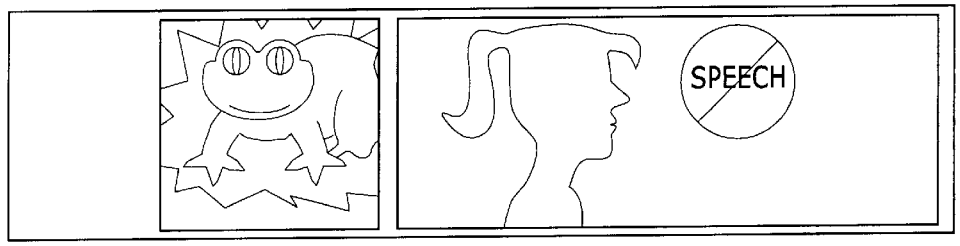
SCREEN DISPLAY FOR ATTRIBUTE - LENGTH
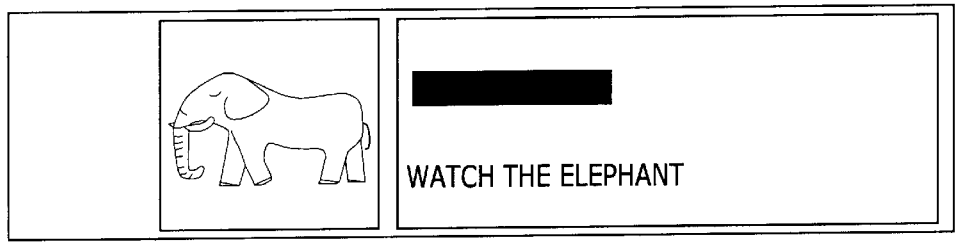
SCREEN DISPLAY FOR ATTRIBUTE - SYLLABLE NUMBER
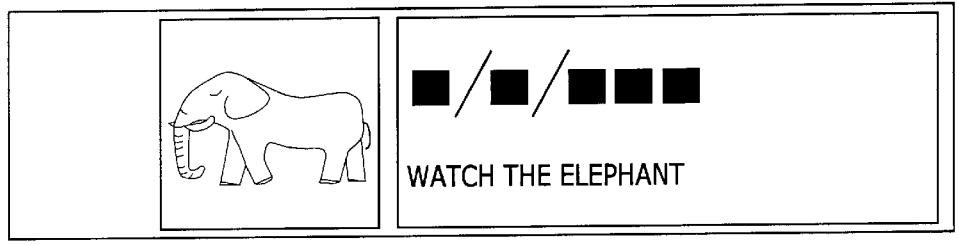
SCREEN DISPLAY FOR ATTRIBUTE - STRESS
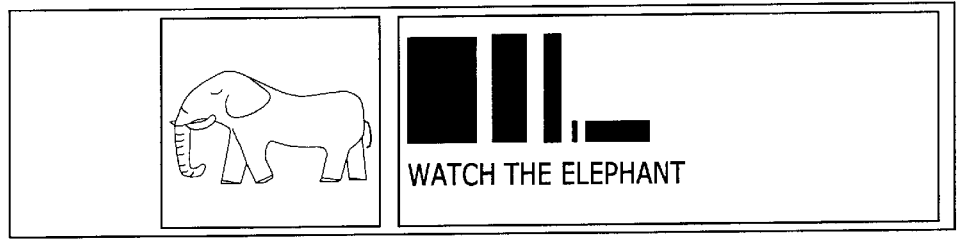
PATTERN PERCEPTION ATTRIBUTE DISPLAYS
Fig. 6A

| TARGET-TOP LEVEL | | TCLUE 1 | TCLUE2 | TCLUE3 | RESPONSE TOP LEVEL | RCLUE1 | RCLUE2 | RCLUE3 |
|---|---|---|---|---|---|---|---|---|
| AV LEVEL 1 | AUDIO-ON | | | | ON | | | |
|  | VISUAL-ON | | | | ON | | | |
| AV LEVEL 2 | AUDIO-ON | D | D | D | ON | D | D | D |
|  | VISUAL-D | D | D | D | ON | ON | ON | ON |
| AV LEVEL 3 | AUDIO-ON | D | D | D | ON | D | D | D |
|  | VISUAL-N | D | D | D | ON | ON | ON | ON |
| AV LEVEL 4 | AUDIO-ON | D | D | D | ON | D | D | D |
|  | VISUAL-N | N | N | N | ON | D | D | D |
| AV LEVEL 5 | AUDIO-ON | | | | ON | | | |
|  | VISUAL-N | | | | D | | | |

AUDITORY VISUAL LEVELS-DISCRIMINATION TASK

| RESPONSE-TOP LEVEL | | RCLUE1 | RCLUE2 | RCLUE3 |
|---|---|---|---|---|
| AV LEVEL 1 | AUDIO-ON | | | |
|  | VISUAL-ON | | | |
| AV LEVEL 2 | AUDIO-ON | ON | ON | ON |
|  | VISUAL-D | ON | ON | ON |
| AV LEVEL 3 | AUDIO-ON | D | D | D |
|  | VISUAL-D | D | D | D |
| AV LEVEL 4 | AUDIO-ON | D | D | D |
|  | VISUAL-N | D | D | D |
| AV LEVEL 5 | AUDIO-ON | D | D | D |
|  | VISUAL-N | N | N | N |
| AV LEVEL 6 | AUDIO-ON | | | |
|  | VISUAL-N | | | |

A/V LEVEL KEY

ON=ALWAYS
D=AVAILABLE ON DEMAND
N=NOT AVAILABLE
TCLUE=TARGET CLUE 1,2 OR 3
RCLUE*=RESPONSE CLUE 1,2 OR 3

*RESPONSE 1 AND 2 A/V LEVELS ARE ALWAYS DISPLAYED THE SAME.

AUDITORY VISUAL LEVELS-IDENTIFICATION TASK

Fig. 7

$\overline{\overline{S}}$ $\overline{\overline{D}}$

AUDIO:
 ON
PIC/TEXT:
 ON

AUDIO:
 ON
PIC/TEXT:
 ON

CLIENT NAME:
LESSON NAME:

AV SETTINGS:

ON: ALWAYS AVAILABLE
NO: NEVER AVAILABLE
DEMAND: NOT PRESENTED INTIALLY,
 BUT AVAILABLE UPON REQUEST

A/V LEVEL1: FULL AUDIO-VISUAL SUPPORT AT TOP LEVEL

AUDITORY/VISUAL LEVELS-DISCRIMINATION TASK

Fig. 8A

| | $\overline{\overline{S}}$ | | | $\overline{\overline{D}}$ |
|---|---|---|---|---|
| | AUDIO: ON<br>PIC/TEXT: DEMAND | AUDIO: ON<br>PIC/TEXT: ON | AUDIO: ON<br>PIC/TEXT: ON | AUDIO: ON<br>PIC/TEXT: ON |
| | AUDIO: ON<br>PIC/TEXT: DEMAND | AUDIO: ON<br>PIC/TEXT: ON | AUDIO: ON<br>PIC/TEXT: ON | AUDIO: ON<br>PIC/TEXT: ON |
| CLIENT NAME:<br>LESSON NAME: | | | | |

A/V LEVEL 2: AUDIO-VISUAL SUPPORT FOR ATTRIBUTES,
TOP LEVEL SUPPORT ON DEMAND

Fig. 8B

| | $\overline{\overline{S}}$ | | | $\overline{\overline{D}}$ |
|---|---|---|---|---|
| | AUDIO: ON<br>PIC/TEXT: DEMAND | AUDIO: DEMAND<br>PIC/TEXT: DEMAND | AUDIO: DEMAND<br>PIC/TEXT: DEMAND | AUDIO: DEMAND<br>PIC/TEXT: DEMAND |
| | AUDIO: ON<br>PIC/TEXT: DEMAND | AUDIO: DEMAND<br>PIC/TEXT: DEMAND | AUDIO: DEMAND<br>PIC/TEXT: DEMAND | AUDIO: DEMAND<br>PIC/TEXT: DEMAND |
| CLIENT NAME:<br>LESSON NAME: | | | | |

A/V LEVEL 3: AUDIO-VISUAL SUPPORT ON DEMAND FOR
ALL LEVELS

Fig. 8C

| | S̿ | | | D̄ |
|---|---|---|---|---|
| | AUDIO: ON PIC/TEXT: NO | AUDIO: DEMAND PIC/TEXT: DEMAND | AUDIO: DEMAND PIC/TEXT: DEMAND | AUDIO: DEMAND PIC/TEXT: DEMAND |
| | AUDIO: ON PIC/TEXT: NO | AUDIO: DEMAND PIC/TEXT: DEMAND | AUDIO: DEMAND PIC/TEXT: DEMAND | AUDIO: DEMAND PIC/TEXT: DEMAND |
| CLIENT NAME: LESSON NAME: | | | | |

A/V LEVEL 4: AUDIO-VISUAL ATTRIBUTE SUPPORT ON DEMAND, AUDIO SUPPORT ONLY FOR TOP LEVEL

Fig. 8D

| | S̿ | | | D̄ |
|---|---|---|---|---|
| | AUDIO: ON PIC/TEXT: NO | AUDIO: DEMAND PIC/TEXT: NO | AUDIO: DEMAND PIC/TEXT: NO | AUDIO: DEMAND PIC/TEXT: NO |
| | AUDIO: ON PIC/TEXT: NO | AUDIO: DEMAND PIC/TEXT: NO | AUDIO: DEMAND PIC/TEXT: NO | AUDIO: DEMAND PIC/TEXT: NO |
| CLIENT NAME: LESSON NAME: | | | | |

A/V LEVEL 5: AUDIO SUPPORT ONLY FOR ALL LEVELS

Fig. 8E

A/V LEVEL 6: AUDIO SUPPORT ONLY AT TOP LEVEL

| STRATEGY TYPE | AV SET | WORD GROUP | RATE |
|---|---|---|---|
| BADFAST | AUDITORY | DIFFERENT | FAST |
| BADMED | AUDITORY | DIFFERENT | MEDIUM |
| BADSLOW | AUDITORY | DIFFERENT | SLOW |
| BASFAST | AUDITORY | SAME | FAST |
| BASMED | AUDITORY | SAME | MEDIUM |
| BASSLOW | AUDITORY | SAME | SLOW |
| BVSFAST | VISUAL | SAME | FAST |
| BVSMED | VISUAL | SAME | MEDIUM |
| BVSSLOW | VISUAL | SAME | SLOW |
| BVDFAST | VISUAL | DIFFERENT | FAST |
| BVDMED | VISUAL | DIFFERENT | MEDIUM |
| BVDSLOW | VISUAL | DIFFERENT | SLOW |
| TADFAST | AUDITORY | DIFFERENT | FAST |
| TADMED | AUDITORY | DIFFERENT | MEDIUM |
| TADSLOW | AUDITORY | DIFFERENT | SLOW |
| TASFAST | AUDITORY | SAME | FAST |
| TASMED | AUDITORY | SAME | MEDIUM |
| TASSLOW | AUDITORY | SAME | SLOW |
| TVSFAST | VISUAL | SAME | FAST |
| TVSMED | VISUAL | SAME | MEDIUM |
| TVSSLOW | VISUAL | SAME | SLOW |
| TVDFAST | VISUAL | DIFFERENT | FAST |
| TVDMED | VISUAL | DIFFERENT | MEDIUM |
| TVDSLOW | VISUAL | DIFFERENT | SLOW |

STRATEGY

Fig. 9

PREVIEW

PRODUCTION TRAINING

THIS PUZZLE HAS BEEN COMPLETED-THE USER WOULD HAVE RECEIVED "PIECES" OF SHIP: PERHAPS THE SHIP'S DECK, THEN A SAIL, THEN A MAST ETC...

FEEDBACK

PAINTING FEEDBACK DISPLAY

| SELECT LEVEL OF SPEECH PERCEPTION |||||
|---|---|---|---|
| PATTERN PERCEPTION SERIES (PROCEED TO PAGE 4) ||||
| CAN THE USER DIFFERENTIATE BETWEEN SPEECH AND NONSPEECH? | YES | NO | DON'T KNOW - GO TO N-SCREEN |
| CAN THE USER DIFFERENTIATE BETWEEN LENGTH OF SPEECH UTTERANCES? | YES | NO | DON'T KNOW - GO TO L-SCREEN |
| IS THE USER AWARE OF NUMBERS OF SYLLABLES IN SPEECH UTTERANCES? | YES | NO | DON'T KNOW - GO TO U-SCREEN |
|  | YES | NO | DON'T KNOW - GO TO T-SCREEN |
| WORD PERCEPTION SERIES (PROCEED TO PAGE 5) ||||
| CAN THE USER DIFFERENTIATE BETWEEN SINGLE WORDS AND A SEQUENCE OF 2-3 WORDS? | YES | NO | DON'T KNOW - GO TO M-SCREEN |
| CAN THE USER DIFFERENTIATE WORDS WHICH ARE ALL DIFFERENT IN THREE-WORD SENTENCES? | YES | NO | DON'T KNOW - GO TO D-SCREEN |
| CAN THE USER DIFFERENTIATE THE FINAL WORD IN A THREE WORD SENTENCE WHEN ONLY THE FINAL WORD IS DIFFERENT? | YES | NO | DON'T KNOW - GO TO S-SCREEN |
| SYLLABLE PERCEPTION SERIES (PROCEED TO PAGE 6) ||||
| CAN THE USER DISTINGUISH BETWEEN WORDS WHICH HAVE DIFFERENT NUMBERS OF SYLLABLES? | YES | NO | DON'T KNOW - GO TO Y-SCREEN |
| PHONEME PERCEPTION SERIES (PROCEED TO PAGE 7) ||||
| CAN THE USER DIFFERENTIATE VOWEL DIFFERENCES IN ONE SYLLABLE WORDS? | YES | NO | DON'T KNOW - GO TO C-SCREEN |
| CAN THE USER DIFFERENTIATE CONSONANT DIFFERENCES IN ONE SYLLABLE WORDS? | YES | NO | DON'T KNOW - GO TO V-SCREEN |

Fig. 13

| SELECT A PATTERN LESSON PACKAGE | |
|---|---|
| SPEECH VS. NONSPEECH (IF UNSURE OF PLACEMENT, SCREEN WITH N-SCREEN PACKAGE) | |
| NONSPEECH SOUNDS ARE CONTRASTED WITH ONE SYLLABLE WORDS. | NONSPCH-1 |
| NONSPEECH SOUNDS ARE CONTRASTED WITH 3-5 SYLLABLE SPEECH UTTERANCES. | NONSPCH-2 |
| NONSPEECH SOUNDS ARE CONTRASTED WITH OTHER NONSPEECH SOUNDS. | NONSPCH-3 |
| LENGTH (IF UNSURE OF PLACEMENT, SCREEN WITH L-SCREEN PACKAGE) | |
| NONSPEECH SOUNDS ARE CONTRASTED WITH ONE SYLLABLE WORDS. | LENGTH-1 |
| NONSPEECH SOUNDS ARE CONTRASTED WITH 3-5 SYLLABLE SPEECH UTTERANCES. | LENGTH-2 |
| 1-3 SYLLABLE WORDS ARE CONTRASTED WITH 2-5 SYLLABLE CONNECTED SPEECH. | LENGTH-3 |
| 1,2 AND 3 SYLLABLE WORDS ARE CONTRASTED | LENGTH-4 |
| CONNECTED SPEECH UTTERANCES VARYING IN LENGTH FROM 2-5 SYLLABLES ARE CONTRASTED. | LENGTH-5 |
| SYLLABLE NUMBER (IF UNSURE OF PLACEMENT, SCREEN WITH U-SCREEN PACKAGE) | |
| ONE SYLLABLE WORDS ARE CONTRASTED WITH 2 OR 3 SYLLABLE WORDS WHICH HAVE DIFFERENT SPECTRAL INFORMATION. | SYLNUM-1 |
| ONE SYLLABLE WORDS ARE CONTRASTED WITH 2 OR 3 SYLLABLE WORDS WHICH HAVE SIMILAR SPECTRAL INFORMATION. | SYLNUM-2 |
| STRESS (IF UNSURE OF PLACEMENT, SCREEN WITH T-SCREEN PACKAGE) | |
| ONE SYLLABLE WORDS ARE CONTRASTED WITH 2-5 SYLLABLE CONNECTED SPEECH UTTERANCES. | STRESS-1 |
| TWO SYLLABLE WORDS ARE CONTRASTED WITH 2-5 SYLLABLE CONNECTED SPEECH UTTERANCES. | STRESS-2 |
| THREE SYLLABLE WORDS ARE CONTRASTED WITH 2-5 SYLLABLE CONNECTED SPEECH UTTERANCES. | STRESS-3 |
| 1-3 SYLLABLE UTTERANCES ARE CONTRASTED. | STRESS-4 |
| 2-5 SYLLABLE CONNECTED SPEECH UTTERANCES ARE CONTRASTED. | STRESS-5 |

Fig. 14A

| SELECT A WORD PERCEPTION LESSON PACKAGE ||
|---|---|
| MIXED SENTENCES (IF UNSURE OF PLACEMENT, SCREEN WITH M-SCREEN PACKAGE) ||
| ONE SYLLABLE WORDS ARE CONTRASTED WITH 2-5 SYLLABLE CONNECTED SPEECH UTTERANCES. | MIXSEN-1 |
| TWO SYLLABLE WORDS ARE CONTRASTED WITH 2-5 SYLLABLE CONNECTED SPEECH UTTERANCES. | MIXSEN-2 |
| THREE SYLLABLE WORDS ARE CONTRASTED WITH 2-5 SYLLABLE CONNECTED SPEECH UTTERANCES. | MIXSEN-3 |
| 2-5 SYLLABLE CONNECTED SPEECH UTTERANCES ARE CONTRASTED. | MIXSEN-4 |
| DIFFERENT SENTENCES (IF UNSURE OF PLACEMENT, SCREEN WITH D-SCREEN PACKAGE) ||
| TWO SENTENCES ARE CONTRASTED IN WHICH ALL THE WORDS ARE DIFFERENT. THE SENTENCES CONSIST OF 3 ONE SYLLABLE WORDS. | DIFSEN-1 |
| TWO SENTENCES ARE CONTRASTED IN WHICH ALL THE WORDS ARE DIFFERENT. THE FINAL WORD OF THE SENTENCES HAS EITHER 2 OR 3 SYLLABLES. | DIFSEN-2 |
| TWO SENTENCES ARE CONTRASTED IN WHICH ALL THE WORDS ARE DIFFERENT. THE FINAL WORD IN EACH SENTENCE IS A ONE SYLLABLE WORD WHICH DIFFERS ONLY BY VOWEL, INITIAL CONSONANT OR FINAL CONSONANT. | DIFSEN-3 |
| SAME SENTENCES (IF UNSURE OF PLACEMENT, SCREEN WITH S-SCREEN PACKAGE) ||
| TWO SENTENCES ARE CONTRASTED IN WHICH THE FIRST TWO WORDS ARE THE SAME AND THE FINAL WORD IS SYLLABICALLY DIFFERENT. THE FINAL WORD HAS EITHER ONE OR THREE SYLLABLES. | SAMSEN-1 |
| TWO SENTENCES ARE CONTRASTED IN WHICH THE FIRST TWO WORDS ARE THE SAME AND THE FINAL WORD IS DIFFERENT. THE SENTENCES CONSIST OF THREE ONE-SYLLABLE WORDS. | SAMSEN-2 |
| TWO SENTENCES ARE CONTRASTED IN WHICH THE FIRST TWO WORDS ARE THE SAME AND THE FINAL WORD IS SYLLABICALLY DIFFERENT. THE FINAL WORD HAS EITHER TWO OR THREE SYLLABLES. | SAMSEN-3 |
| TWO SENTENCES ARE CONTRASTED IN WHICH THE FIRST TWO WORDS ARE THE SAME AND THE FINAL WORD IS DIFFERENT. THE FINAL WORD IN EACH SENTENCE IS A ONE-SYLLABLE WORD WHICH DIFFERS ONLY BY VOWEL, INITIAL CONSONANT OR FINAL CONSONANT. | SAMSEN-4 |

Fig. 14B

| SELECT A SYLLABLE PERCEPTION LESSON PACKAGE | |
|---|---|
| SYLLABLES (IF UNSURE OF PLACEMENT, SCREEN WITH Y-SCREEN PACKAGE) | |
| 1-3 SYLLABLE WORDS WHICH HAVE DIFFERENT SPECTRAL CHARACTERISTICS ARE CONTRASTED. | SYL123-1 |
| 1-3 SYLLABLE WORDS WHICH MAY HAVE SIMILAR OR DIFFERENT SPECTRAL CHARACTERISTICS ARE CONTRASTED. | SYL123-2 |
| 1-3 SYLLABLE WORDS WHICH HAVE LOW FREQUENCY CHARACTERISTICS ARE CONTRASTED. | SYL123-3 |
| 1-3 SYLLABLE WORDS WHICH HAVE HIGH FREQUENCY CHARACTERISTICS ARE CONTRASTED. | SYL123-4 |
| 1 SYLLABLE WORDS WHICH HAVE SIMILAR SPECTRAL CHARACTERISITICS ARE CONTRASTED. | SYL123-5 |
| 2 SYLLABLE WORDS WHICH HAVE SIMILAR SPECTRAL CHARACTERISTICS ARE CONTRASTED. | SYL123-6 |
| 3 SYLLABLE WORDS WHICH HAVE SIMILAR SPECTRAL CHARACTERISTICS ARE CONTRASTED. | SYL123-7 |
| SYLLABLES (SEMANTIC LESSONS-HAVE NO SCREENING LESSON PACKAGE) | |
| ANIMALS AND ANIMAL PARTS LESSONS WITH 1-3 SYLLABLE CONTRASTS. | SEMAN-1 |
| FOODS WITH 1-3 SYLLABLE CONTRASTS. | SEMAN-2 |
| COLORS, BODY PARTS AND CLOTHING PIECES WITH 1-3 SYLLABLE CONTRASTS. | SEMAN-3 |
| HOME ITEMS, TOYS AND TRANSPORTATION WITH 1-3 SYLLABLE CONTRASTS. | SEMAN-4 |
| JOBS, VERBS AND BUILDINGS WITH 1-3 SYLLABLE CONTRASTS. | SEMAN-5 |

Fig. 14C

| SELECT A PHONEME LESSON PACKAGE ||
|---|---|
| CONSONANTS (IF UNSURE OF PLACEMENT, SCREEN WITH C-SCREEN PACKAGE) ||
| INITIAL CONSONANT VOICING, PLACEMENT AND MANNER DIFFERENCES ARE CONTRASTED. | CONSON-1 |
| FINAL CONSONANT VOICING, PLACEMENT AND MANNER DIFFERENCES ARE CONTRASTED. | CONSON-2 |
| VOWELS (IF UNSURE OF PLACEMENT, SCREEN WITH V-SCREEN PACKAGE) ||
| HIGH VOWELS VS. MID DIPTHONGS/VOWELS ARE CONTRASTED. | VOWEL-1 |
| HIGH VOWELS VS. HIGH OR LOW DIPTHONGS/VOWELS ARE CONTRASTED. | VOWEL-2 |
| HIGH, LOW OR MID DIPTHONGS/VOWELS VS. MID OR HIGH DIPTHONGS/VOWELS ARE CONTRASTED. | VOWEL-3 |

Fig. 14D

| SELECT THE TASK MODE |||
|---|---|---|
| DO YOU WANT THE USER TO MAKE SAME/DIFFERENT JUDGMENTS ABOUT THE STIMULI (DISCRIMINATION TASK)? | YES | NO |
| DO YOU WANT THE USER TO MATCH A TARGET TO ONE OF SEVERAL CHOICES (IDENTIFICATION TASK)? | YES | NO |

Fig. 15

| SELECT THE STRATEGY FOR MOVING THROUGH THE LESSONS |||||
|---|---|---|---|---|
| INITIAL PRESENTATION | DOES THE USER NEED TO HEAR BOTH THE TARGETED STIMULUS AND THE POSSIBLE CHOICES OR ONLY THE TARGETED STIMULUS ON INITIAL PRESENTATION? | T=TARGET ONLY | B=BOTH TARGET AND ANSWERS | |
| SUPPORT | IF THE USER CANNOT PERFORM WITH AUDITORY INFORMATION ALONE, IS IT APPROPRIATE TO INTRODUCE VISUAL INFORMATION WITH THE AUDITORY INFORMATION? | V=VISUAL OKAY | A=AUDITORY ONLY | |
| SAME/ DIFFERENT WORD GROUP | AS THE TASKS PROGRESS FROM AUDITORY/VISUAL SUPPORT, DOES THE USER NEED TO SEE THE SAME GROUP OF STIMULI OR NEW STIMULI? | S=SAME GROUP | D=DIFFERENT GROUP | |
| RATE | AS THE USER PROGRESSES THROUGH A SERIES OF TASKS, WHAT RATE IS APPROPRIATE? IS IT APPROPRIATE FOR THE USER TO SYSTEMATICALLY PROGRESS FROM AV LEVEL 1-5 (SLOW), OR SKIP EVERY OTHER AV LEVEL (MEDIUM), OR PROGRESS TO THE MOST DIFFICULT LEVEL AFTER THE ENTRY LEVEL (FAST)? | SLOW | MEDIUM | FAST |

Fig. 16

| SELECT THE AUDIO/VISUAL (AV) SUPPORT | |
|---|---|
| THE USER NEEDS TO SEE/HEAR FULL AV SUPPORT AT THE ONSET OF TRAINING. | LEVEL 1 |
| THE USER SHOULD HAVE ACCESS TO FULL AV SUPPORT EVEN IF IT IS NOT AVAILABLE INITIALLY. | LEVEL 2 |
| THE USER CAN PERFORM WITH AUDITORY-ONLY INFORMATION AT THE TARGETED TOP LEVEL. ACCESS TO ALL OTHER AV SUPPORT IS AVAILABLE ON REQUEST. | LEVEL 3 |
| THE USER CAN PERFORM WITH AUDITORY-ONLY INFORMATION AT THE TARGETED TOP LEVEL WHEN NO CLUE SUPPORT IS AVAILABLE AT THE TOP LEVEL. | LEVEL 4 |
| THE USER CAN PERFORM WITH AUDITORY-ONLY INFORMATION AT THE TARGETED TOP LEVEL WHEN NO CLUE SUPPORT IS AVAILABLE AT THE TARGET OR ANSWER LEVELS. | LEVEL 5 |

Fig. 17

| SELECT SPECIFIC TASKS | | |
|---|---|---|
| DO YOU WANT THE USER TO HAVE THE PRETEST TASK? | YES | NO |
| DO YOU WANT THE USER TO HAVE THE PREVIEW TASK? | YES | NO |
| DO YOU WANT THE USER TO HAVE THE TRAINING TASKS (DISCRIMINATION AND/OR IDENTIFICATION) IN THEIR LESSONS? | YES | NO |
| DO YOU WANT THE USER TO DO THE PRODUCTION TASK? | YES | NO |
| DO YOU WANT THE USER TO HAVE THE POSTTEST TASK? | YES | NO |

Fig. 18

| SELECT THE USER'S LESSON DEFAULTS | | |
|---|---|---|
| CHOOSE FEEDBACK SETTINGS | | |
| IF THE PUZZLE FEEDBACK IS PRESENTED, SPECIFY AFTER HOW MANY TASKS? | _# | |
| IS ANY TRY O.K.? (IF NO, THE NUMBER OF PUZZLE PIECES PRESENTED IS CONTINGENT ON THE USER'S PERFORMANCE; OTHERWISE, ALL PUZZLE PIECES ARE GIVEN.) | YES | NO |
| IF THE PAINTING TASK IS TO BE GIVEN, AFTER HOW MANY TASKS AND FOR WHAT TIME PERIOD? | _TASKS | _SEC. |
| SHOULD THE GREEN MAGIC CHARACTER BE AVAILABLE ON SCREEN DISPLAYS? | YES | NO |
| CHOOSE TASK SETTINGS | | |
| HOW MANY TRAINING CONTRASTS SHOULD THE USER HAVE? | _# | |
| HOW MANY REPETITIONS OF EACH OF THE TRAINING CONTRASTS SHOULD THE USER HAVE? | _# | |
| HOW MANY TEST CONTRASTS SHOULD THE USER HAVE? | _# | |
| HOW MANY REPETITIONS OF EACH OF THE TEST CONTRASTS SHOULD THE USER HAVE? | _# | |
| SHOULD A 2-CHOICE OR 4-CHOICE SCREEN BE GIVEN IN THE IDENTIFICATION TASK? | 2 | 4 |
| HOW MANY RETRIES FOR EACH TRIAL SHOULD BE GIVEN? | _# | |
| CHOOSE LIBRARIES FOR AV SETTINGS | | |
| SHOULD THE TEXT BE SHOWN? | YES | NO |
| WHICH PICTURE GROUP IS APPROPRIATE TO USE FOR VISUAL SUPPORT? (ST=STANDARD ILLUSTRATIONS, O=ORAL [MOUTH POSTURES], SEE 2 =SIGNING EXACT ENGLISH.) | ST / O | SEE 2 |

Fig. 19

MAIN MENU

F2  SUPPORT LIBRARIES MENU
F3  CREATE/EDIT USERS
F4  LESSON COMPONENTS MENU
F10 EXIT EDITOR

Fig. 20A

USER EDITOR

F2  CREATE USER FILE
F3  SELECT USER FILE
F4  ADD USER
F5  EDIT USER
F6  DELETE USER
F7  VIEW USERS
F10 EXIT TO PREVIOUS

Fig. 20B

DO YOU WANT TO COPY AN EXISTING USER (Y/N)?

Fig. 20C

EDIT A USER

USER ID: TYPE USERNAME PRESS <ENTER>

Fig. 20D

NAME: ADRIAN
BIRTHDATE: 01/10/89      "EXAMPLE"
GROUP: PRESCHOOL
OUTPUT DEVICE: C1
REPORT DIR:

CURRENT LESSON: 3      USER DEFAULTS      LESSONS:

FEEDBACK: ALL                             TASKS TO FEEDBACK: 1
PUZZLE FEEDBACK BEFORE PAINTING: 3        PAINTING TIME ALLOWED
ANY TRY OK: NO                            IN SECONDS: 120
                                          MAGIC: YES

Fig. 20E

```
F1=HELP   /TAB/BKTAB/ENTER=MOVE   DEL=DELETE   ESC=PREVIOUS SCREEN
```

USER: STANDARD
LESSON: *                     PERCEPTION MODE: *
WORDLIST: F2                  STRATEGY: F2
ATTRIBUTE SET: F2             STARTING AV LEVEL: #

<center>TASKS</center>

PREVIEW: *                TRAINING: *         TASK PASS %: #
PRETEST: *                POSTTEST: *         RESERVE TESTING GROUP: *
PRETEST JUDGMENT: *       ADVANCE %: #        ENTER %: #
PRODUCTION: *                                 PRODUCTION AV LEVEL: #
METHOD OF GROUPING CONTRASTS FROM WORDLIST: *

<center>TASK SETTINGS</center>

TRAINING CONTRASTS: #         REPS/TRAINING CONTRASTS: # (TRIALS= )
TEST CONTRASTS: #             REPS/TEST CONTRASTS: #     (TRIALS= )
NUMBER OF SCREEN CHOICES: *   RETRIES PER TRIAL: #

<center>AV LIBRARY SETTINGS</center>

USE TEXT: *                   SITE GROUP: #
PICTURE GROUP: *              AUDIO GROUP: *
AUDIO OVERLAY NAME: F2        AUDIO OVERLAY LEVEL: #

TO ENTER YOUR SELECTIONS THE FOLLOWING KEY EXPLAINS THE
NECESSARY ACTION NEEDED TO ENTER/CHANGE THE ABOVE OPTIONS:
F2 = MAKE YOUR SELECTION BY PRESSING F2, THEN MOVE THE CURSOR
TO THE DESIRED ENTRY AND PRESS <ENTER>.
  * = SELECTIONS CAN BE MADE BY PRESSING THE SPACE BAR.
  # = ENTER THE DESIRED NUMBER AFTER BACKSPACING OVER THE
     CURRENT VALUE.
(TRIALS = ) = THESE NUMBERS WILL BE AUTOMATICALLY CALCULATED.

<div align="right">Fig. 20F</div>

```
F1=HELP  /TAB/BKTAB=MOVE   DEL=DELETE  F5=LOAD PACKAGE  INS=
INSERT SPACE
F2=SELECT LESSON    ENTER=SELECT
USER: STANDARD
   LESSON   TASK    WORDLIST   ATTRIBUTE   STRATEGY   STARTING
            MODE                                      AV LEVEL

*DEFAULTS*
1)
2)
3)
4)
5)
6)
7)
8)
9)
10)
11)
12)
13)
14)
15)
```

Fig. 20G

DO YOU WISH TO USE THE USER'S DEFAULT?

Fig. 20H

```
F1=HELP  /TAB/BKTAB=MOVE   DEL=DELETE   F5=LOAD PACKAGE   INS=
INSERT SPACE
F2=SELECT LESSON    ENTER=SELECT
USER: STANDARD
   LESSON    TASK    WORDLIST   ATTRIBUTE    STRATEGY    STARTING
             MODE                                         AV LEVEL

*DEFAULTS*
1)
2)
3)
4)                           LESSON PACKAGES
5)
6)              CONSON-1     INITIAL CONSONANT
7)              CONSON-2     INITIAL CONSONANT
8)              NONSPCH-1    NONSPEECH V. WORD
9)              NONSPCH-2    NONSPEECH V. SENTENCE
10)             SYL123-1     1 SYL WORD V. 3 SYL WORD
11)             SYL 123-2    2 SYL WORD V. 3 SYL WORD
12)             SEMANT-1     ANIMALS, 1,2,3 SYLLABLES
13)
14)
15)
```

Fig. 20I

```
WORD LIST: CFM-1

USE WORDLIST SET 1: YES    FINAL CON MANNER
USE WORDLIST SET 2: YES    FINAL CON MANNER
USE WORDLIST SET 3: NO
USE WORDLIST SET 4: NO
```

Fig. 20J

| | |
|---|---|
| BADFAST | AUD/DIFFERENT/FAST |
| BADMED | AUD/DIFFERENT/MEDIUM |
| BADSLOW | AUD/DIFFERENT/SLOW |
| BASFAST | AUD/SAME/FAST |
| BASMED | AUD/SAME/FAST |
| BASSLOW | AUD/DIFFERENT/SLOW |
| BVDFAST | VIS/DIFFERENT/FAST |
| BVDMED | VIS/DIFFERENT/MEDIUM |
| BVDSLOW | VIS/DIFFERENT/SLOW |
| BVSFAST | VIS/SAME/FAST |
| BVSMED | VIS/SAME/MEDIUM |
| BVSSLOW | VIS/SAME/SLOW |
| TADFAST | AUD/DIFFERENT/FAST |
| TADMED | AUD/DIFFERENT/MEDIUM |
| TADSLOW | AUD/DIFFERENT/SLOW |
| TASFAST | AUD/SAME/FAST |
| TASMED | AUD/SAME/MEDIUM |
| TASSLOW | AUD/SAME/SLOW |
| TVDFAST | VIS/DIFFERENT/FAST |
| TVDMED | VIS/DIFFERENT/MEDIUM |
| TVDSLOW | VIS/DIFFERENT/SLOW |
| TVSFAST | VIS/SAME/FAST |
| TVSMED | VIS/SAME/MEDIUM |
| TVSSLOW | VIS/SAME/SLOW |

Fig. 20K

| | |
|---|---|
| LENGTH | LENGTH |
| NONSPEECH | NONSPEECH |
| PHONEME | PHONEME |
| STRESS | STRESS |
| SYL123 | SYLLABLE 1 2 3 |
| SYLINSSENT | SYLLABLES IN SENTENCES |
| SYLNUM | SYLLABLE NUMBER |
| WORD 123 | WORD 123 |

Fig. 20L

SPEECH AND NONSPEECH
PATTERN PERCEPTION

LENGTH
PATTERN PERCEPTION

SYLLABLE NUMBER
PATTERN PERCEPTION

STRESS
PATTERN PERCEPTION

| WHOLE UTTERANCE | WORD 1 | WORD 2 | WORD 3 |
|---|---|---|---|
| ? 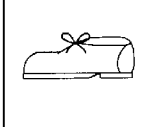 | 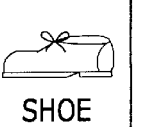 SHOE | | |
| ○ 1 | SEE | MY | 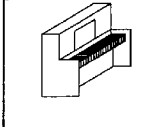 PIANO |
| 2 ○ |  | 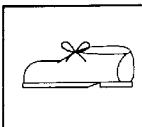 SHOE | |
| CLIENT NAME: LESSON NAME: | | | |
MIXED WORDS & SENTENCES
WORD PERCEPTION
Fig. 21E
| WHOLE UTTERANCE | WORD 1 | WORD 2 | WORD 3 |
|---|---|---|---|
| ?  | SEE | THE |  SKYSCRAPER |
| ○ 1 |  I | LIKE | 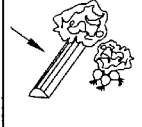 CELERY |
| 2 ○ |  | 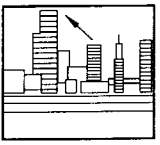 SEE | THE  SKYSCRAPER |
| CLIENT NAME: LESSON NAME: | | | |
DIFFERENT SENTENCES
WORD PERCEPTION
Fig. 21F

| WHOLE UTTERANCE | | WORD 1 | WORD 2 | WORD 3 |
|---|---|---|---|---|
| ? | ✏️← | | | ✏️← ERASER |
| 1 ○ | ✏️← | GET | THE | ERASER |
| 2 ○ | ✉️ | GET | THE | ENVELOPE |
| CLIENT NAME:<br>LESSON NAME: | | | | |

SAME SENTENCES
WORD PERCEPTION

Fig. 21G

| WHOLE UTTERANCE | | SYLLABLE 1 | SYLLABLE 2 | SYLLABLE 3 |
|---|---|---|---|---|
| ? | 🐘 ELEPHANT | ▬ EL | ▬ E | ▬ PHANT |
| 1 ○ | 🐘 ELEPHANT | ▬ EL | ▬ E | ▬ PHANT |
| 2 ○ | 🥚 | ▬ EGG | ▬ BEAT | ▬ ER |
| CLIENT NAME:<br>LESSON NAME: | | | | |

WORDS-SYLLABLE LEVEL
SYLLABLE PERCEPTION

Fig. 21H

WORDS-CONSONANT FEATURES
PHONEME PERCEPTION

WORDS-VOWEL DIFFERENCES
PHONEME PERCEPTION

USER REPORT MENUS

INITIAL SCREEN

| ACTION | SETUP | HELP | F10 MENU   F1 HELP |
|---|---|---|---|
| SELECT ALT L<br>DELETE ALT D<br>OUTPUT ALT D<br>EXIT    ALT X | DISPLAY F2 | ACTION F1<br>FORMAT<br>ABOUT REPORT | |

USER SELECTION

```
SELECT USER

KEN IDENTIFICATION
  KEN PREVIEW
  KEN PRODUCTION

[ALL]  [OK]  [CANCEL]
```

DATE SELECTION

```
SET DATE RANGE

START DATE  [     ]
END DATE    [     ]

[OK]  [CANCEL]
```

DISPLAY SELECTION

```
DISPLAY FORMAT
[ ] RESPONSE TYPE PERCENT
[ ] RESPONSE TIME
[ ] FREQUENCY COUNT
[ ] CLASS REPETITIONS

[OK]  [CANCEL]
```

Fig. 22C

REPORT GENERATOR MENUS

INITIAL SCREEN

| VIEW | HELP | F10 MENU  F1 HELP |
|---|---|---|
| VIEW REPORT<br>VIEW SELECT DATA | VIEW<br>ABOUT REPORT GENERATOR | |

TASK SELECTION

TASK TYPE
- DISCRIMINATION
- IDENTIFICATION
- PREVIEW
- PRODUCTION

[OK]  [CANCEL]

INDEPENDENT VARIABLE SELECTION

INDEPENDENT VARIABLES
- GROUP
- USER
- TIME RANGE
- DEVICE TYPE
- TASK NAME

[ANOTHER]  [OK]  [CANCEL]

PROCESS SELECTION

PROCESS SELECTION
- ( ) DEPENDENT VARIABLE
- ( ) PLOT
- ( ) LIST
- ( ) TASK BY TASK
- ( ) SAVE DATABASE
- ( ) SORT

[OK]  [CANCEL]

DISPLAY SELECTION

DEPENDENT VARIABLES
- ( ) RESPONSE TYPE
- ( ) RESPONSE CLASS
- ( ) AVERAGE RESPONSE CLASS
- ( ) FREQUENCY COUNT
- ( ) AVERAGE FREQUENCY COUNT
- ( ) % FREQUENCY COUNT
- ( ) SEQUENTIAL ANALYSIS

[OK]  [CANCEL]

Fig. 22D

| RESPONSE TYPES | EXAMPLES OF DATA OUTPUT, DISCRIMINATION TASK |
|---|---|

CORRECT         SAME

```
          CLASS       A      A      A      B      B      B      A      B      B      B
                      ^      ^      ^      ^      ^      ^      ^      ^      ^      ^
EXPLORE-CORRECT       S1     S11    S12    S13    S2     S1     S2     S21    S12    S22    S12
                     MOON /  M  /   OO /   N  / MEAN / MOON / MEAN /   M  /   OO  /  EA  /  OO

CLASS       A      A      A      A      A      B      A      A      A      B
                      ^      ^      ^      ^      ^      ^      ^      ^      ^      ^
EXPLORE-CORRECT       S1     S11    S11    S12    S11    S13    S2     S23    S22    S21    S12
                     MOON /  M  /   M  /   OO /   M  /   N  / MEAN /   N  /   EA  /  M  /   OO
```

WRONG           DIFFERENT

---

EXAMPLES OF DATA OUTPUT, MATCHING TASK

CORRECT         R1

```
          CLASS       E      E      E      A      E      C      D      E      E      D      E
                      ^      ^      ^      ^      ^      ^      ^      ^      ^      ^      ^
EXPLORE-CORRECT       R1     S1     R2     S1     S1     R1     R11    R21    S1     R1     R2     S1

CLASS       C      C      E      A      A      E      C      C      C      C
                      ^      ^      ^      ^      ^      ^      ^      ^      ^      ^
EXPLORE-WRONG         R2     R21    R22    S1     S11    S12    R1     R12    R11    R13    R1
```

WRONG           R2

---

CLASSES

--WITHIN-STIMULI COMPARISONS         D--BETWEEN-RESPONSE COMPARISONS

--BETWEEN-STIMULI COMPARISONS        E--BETWEEN-STIMULI & RESPONSE
                                            COMPARISONS
--WITHIN-RESPONSE COMPARISONS

Fig. 22F

2A. SEQUENTIAL ANALYSIS, DISCRIMINATION TASK

AVERAGE "WITHIN-STIMULI" COMPARISONS IN A RUN;

AVERAGE "BETWEEN-STIMULI" COMPARISONS IN A RUN;

PROPORTION OF WITHIN/BETWEEN COMPARISONS;

PROPORTION OF WITHIN/BETWEEN RUNS;

2B. SEQUENTIAL ANALYSIS, MATCHING ID TASK

AVERAGE "WITHIN-STIMULI" COMPARISONS IN A RUN;

AVERAGE "WITHIN-RESPONSE" COMPARISONS IN A RUN;

AVERAGE "BETWEEN-RESPONSE" COMPARISONS IN A RUN;

AVERAGE "BETWEEN-STIMULI AND RESPONSE" COMPARISONS IN A RUN;

PROPORTION OF WITHIN/BETWEEN COMPARISONS;

PROPORTION OF WITHIN/BETWEEN RUNS;

Fig. 22G

DATE: 04/02/1993                                                              PAGE: 1

Fig. 22H

NAME:
SUBJECT: 1
DEVICE: HEADPHONES

| | | | C | EC | EW | W | WC | CLASS | TYPE |
|---|---|---|---|---|---|---|---|---|---|
| M1C-1I IPREE5 | | | | | | | | | |
| 02/03/93 | 2:31 PM | RESP PERCENT | 66.67 | 16.67 | 16.67 | 0.00 | 0.00 | A: | 0 |
| | | RESP TIME | 56.35 | 19.39 | 18.84 | 0.00 | 0.00 | B: | 1 |
| | | STIM REP | 0 | 1 | 2 | 0 | 0 | C: | 0 |
| | | RESP REP | 0 | 0 | 0 | 0 | 0 | D: | 0 |
| | | | | | | | | E: | 0 |
| M1C-1I IDA2 | | | C | EC | EW | W | WC | CLASS | TYPE |
| 02/03/93 | 2:34PM | RESP PERCENT | 0.00 | 100.00 | 0.00 | 0.00 | 0.00 | A: | 0 |
| | | RESP TIME | 0.00 | 65.91 | 0.00 | 0.00 | 0.00 | B: | 16 |
| | | STIM REP | 0 | 28 | 0 | 0 | 0 | C: | 20 |
| | | RESP REP | 0 | 41 | 0 | 0 | 0 | D: | 7 |
| | | | | | | | | E: | 20 |
| M1C-1I IDA3 | | | C | EC | EW | W | WC | CLASS | TYPE |
| 02/03/93 | 2:43PM | RESP PERCENT | 0.00 | 83.33 | 0.00 | 0.00 | 16.67 | A: | 0 |
| | | RESP TIME | 0.00 | 64.58 | 0.00 | 0.00 | 4.01 | B: | 12 |
| | | STIM REP | 0 | 19 | 0 | 0 | 3 | C: | 18 |
| | | RESP REP | 0 | 32 | 0 | 0 | 7 | D: | 8 |
| | | | | | | | | E: | 16 |
| L23-1I IPREE5 | | | C | EC | EW | W | WC | CLASS | TYPE |
| 02/04/93 | 1:53PM | RESP PERCENT | 0.00 | 100.00 | 0.00 | 0.00 | 0.00 | A: | 0 |
| | | RESP TIME | 0.00 | 51.57 | 0.00 | 0.00 | 0.00 | B: | 0 |
| | | STIM REP | 0 | 6 | 0 | 0 | 0 | C: | 0 |
| | | RESP REP | 0 | 6 | 0 | 0 | 0 | D: | 0 |
| | | | | | | | | E: | 6 |
| L3E-1I IPREE5 | | | C | EC | EW | W | WC | CLASS | TYPE |
| 02/04/93 | 1:57PM | RESP PERCENT | 0.00 | 100.00 | 0.00 | 0.00 | 0.00 | A: | 0 |
| | | RESP TIME | 0.00 | 27.31 | 0.00 | 0.00 | 0.00 | B: | 0 |
| | | STIM REP | 0 | 6 | 0 | 0 | 0 | C: | 0 |
| | | RESP REP | 0 | 6 | 0 | 0 | 0 | D: | 0 |
| | | | | | | | | E: | 6 |
| L23-1I IPREE5 | | | C | EC | EW | W | WC | CLASS | TYPE |
| 02/04/93 | 2:01PM | RESP PERCENT | 0.00 | 100.00 | 0.00 | 0.00 | 0.00 | A: | 0 |
| | | RESP TIME | 0.00 | 24.51 | 0.00 | 0.00 | 0.00 | B: | 0 |
| | | STIM REP | 0 | 6 | 0 | 0 | 0 | C: | 0 |
| | | RESP REP | 0 | 6 | 0 | 0 | 0 | D: | 0 |
| | | | | | | | | E: | 6 |
| L3E-1I IPREE5 | | | C | EC | EW | W | WC | CLASS | TYPE |
| 02/04/93 | 2:06PM | RESP PERCENT | 0.00 | 50.00 | 50.00 | 0.00 | 0.00 | A: | 0 |
| | | RESP TIME | 0.00 | 17.34 | 11.27 | 0.00 | 0.00 | B: | 0 |
| | | STIM REP | 0 | 3 | 3 | 0 | 0 | C: | 0 |
| | | RESP REP | 0 | 3 | 3 | 0 | 0 | D: | 0 |

APPARATUS FOR INTERACTIVE ADAPTIVE LEARNING BY AN INDIVIDUAL THROUGH AT LEAST ONE OF A STIMULI PRESENTATION DEVICE AND A USER PERCEIVABLE DISPLAY

BACKGROUND OF THE INVENTION

A. Field of the Invention

The present invention relates to the field of learning assistance tools and techniques, and in particular, to computerized systems that can be used in training or learning programs for such things as hearing, speech, reading, writing, mathematics, and language skills.

B. Problems in the Art

Through history many attempts have been made to facilitate more efficient learning of what will be called rule-based systems. Examples are speech and language skills, and mathematical skills. Historically, and yet today, the most conventional learning methods use repetitive, rote learning, which includes teacher/student interaction.

For example, teaching of reading or writing generally involves repetitive exercises by the learner, beginning with very basic, simple tasks and progressing through more and more difficult tasks. This obviously is "labor" intensive, both from the standpoint of the learner and any teacher or assistant that is monitoring or assisting in the learning exercises. Teachers must spend significant amounts of hands-on time, particularly with students that have special needs or learning difficulties.

This type of "manual" learning training is therefore time and resource intensive. It also is susceptible to a certain amount of subjectivity on the part of either student or teacher. Still further it relies significantly on the discipline, interest, and skills of student and teacher.

A more concrete example is as follows. A young student with hearing impairment is to begin to learn to decode spoken language. A teacher, with or without the assistance of recorded sound, repetitively presents spoken words to the student and attempts to train recognition of spoken language. Pictures or other perceivable information can be manually presented to the student along with the spoken words. The teacher decides the pace and content of each lesson and controls the progression of the student subjectively.

The time and effort of the teacher is critical to success of the program. Such valuable one-on-one learning is extremely valuable, and therefore difficult to obtain for a wide range of students. Therefore, one-on-one teaching time is in many cases by necessity essentially rationed. Students are left to practice or train on their own, or without expert assistance. A deficiency in this arrangement is the lack of supervision and the reliance on the individual for progress. Still further, standardized training materials may not function well for students with atypical or problematic learning or perception skills.

Attempts at improvement in this area have involved development of somewhat automated or computerized training systems. A substantial number of interactive computerized systems are based primarily on game-type exercises which present tasks which demand a right or wrong answer. The student simply takes the "test" and is scored on the number of right or wrong answers. The primary deficiency in such systems is the lack of flexibility for students with different learning styles or capabilities.

Such a student just may not function efficiently in a stark "right" or "wrong" question/answer system.

Still further, such present day interactive systems are somewhat limited in that they are directed only to fairly narrow, limited aspects of learning or training relating to certain subject matter.

Systems have therefore been developed, called individual learning systems (ILS) that attempt to tailor the learning task to individual students. These systems are still based primarily on right or wrong answers, and even though somewhat individualized, are not as flexible as might be desired.

The present state of the art therefore lacks flexibility. There is no satisfactory system that can be used for wide variety of individualized problems or learning skills, or which is applicable to a wide range of standard course contents or a wide variety of courses. Still further, the state of the art has room for improvement in the way special learning problems are handled. In effect, many allegedly high technology individualized computerized systems may be no better, or even worse than, training on a one-on-one basis with a human teacher.

Additionally, a need exists in the art for a powerful training and learning system that is integratable with a number of different learning tasks and subject matter. A need exists with regard to efficiency in terms of economical allocation of resources, speed in terms of providing the most efficient progress for individualized learning skills, incentive in terms of providing motivation for learners and/or teachers to succeed and progress at the most beneficial rate; all to maximize the learning potential and success for the least amount of time and dollars.

It is widely acknowledged that education is truly a key to many facets of life. In fact, education is and historically has been, in the United States and many countries, a leading public policy priority. Therefore, improvements in the ability to provide learning, from the standpoint of meaningful success for the students, as well as efficient allocation of resources towards that end, should be a primary goal of all levels of government and its citizens. Studies have shown that one root of illiteracy is lack of foundational learning and training by the first grade level. A need therefore exists regarding efficient and effective training of pre-reading skills for first graders and even kindergartners. The ability of children this age to self-teach is minimal. Therefore, an effective automated learning assistance system would be of tremendous value to children, as well as society in general, if viewed from a long-term perspective.

Additionally, there is great need and increasingly reduced resources for assisting in learning for deaf or the hearing impaired, particularly younger children who would value greatly from speech perception and reading training.

C. Objectives and Advantages of the Invention

It is therefore a principle object and advantage of the present invention to provide an interactive learning assistance system which improves upon the state of the art or solves many problems in the state of the art.

Other objects and advantages of the present invention are to provide a system as above described which:

Allows most efficient learning, and accommodates different ways of learning both for normal and problem learners.

Provides a process-oriented learning training system rather than simply right/wrong learning training.

Provides a system that is dynamic in the sense that it is self-adjusting to different learners' speeds, styles, and needs.

Is multisensory and perceptually based.

Allows discovery and exploration for learning rather than imposed rules for learning.

Does not focus on a presumed learning technique for everyone.

Is truly individualized for each learner.

Is flexible but integrateable to many applications and needs.

Allows selection or imposition of various performance strategies and levels.

Provides for on-call reporting to allow evaluation of progress and changing of strategies at any time.

Allows continuous and comprehensive recordation of user responses to derive learning styles along with performance criteria.

Can be used for a variety of learning, including speech perception, vocabulary, reading, mathematics, geography, language (English and foreign) and other rule-based subject matter.

Empowers efficiency in learning including improved speed in learning which translates into more efficient use of time and money.

Is substantially automated and automatic in its dynamic adjustment to learning styles.

Allows a number of options and features which can enhance learning, for example, interjecting background noise over speech recognition training stimuli for those who are hard of hearing.

These and other objects, features, and advantages of the invention will become more apparent with reference to the accompanying specification and claims.

SUMMARY OF THE INVENTION

The present invention, in its broadest sense, relates to a system that can be used to transfer learning. It relates to learning assistance, particularly for rule-based systems. Examples are speech, reading, math, and languages. The student interacts with a computer. A user interface includes a computer display, some type of stimuli presentation device (visual, auditory, or otherwise), and a manually operable response device such as a keyboard, touch screen, or mouse. Software presents a series of logically coded analytical units (stimuli) to the user. These analytical units are taken from a predetermined set of core stimuli which can consist, for example, of sentences, words, sounds, images, etc.

The user is presented with tasks, for example to compare two stimuli and respond whether they are the same or different. The software allows the user to explore or discover information about the two stimuli before making a decision by allowing the user to selectively access further information regarding the stimuli. Different levels of difficulty of the tasks are available. Difficulty levels can be presented based on the amount of sub-information made available to the user regarding any stimuli, the difficulty of the task, time limits imposed on completing the task, rate of progression from less difficult to more difficult, and other criteria.

To begin a session, the range of level of difficulty is determined for a user. Access to a given amount of information regarding the task can either be selected by an instructor, or the software will test the user and automatically select a beginning level. Thereafter, the system will continuously and comprehensively monitor the performance of the user and provide feedback, not solely on success-rate based on right or wrong responses, but also on type of response, the time it takes to respond, and the specific discovery and answering strategy utilized.

The user's performance therefore is continuously, essentially in real time, analyzed by comparison to standardized and preset goals or criteria based on right/wrong criteria, but also on non-right/non-wrong criteria. As a result of that feedback, the pre-selected strategies and progression plan will be adjusted. Essentially, tasks can be made more or less difficult depending on performance and method of performance. The level of difficulty can be changed not only as to the subject matter of the stimuli, but also in more subtle aspects, such as rate of progression in each lesson, the amount of information available for exploration and discovery for each task, the type of information made available to discover, etc.

Software therefore automatically and dynamically sets and controls strategy and movement of the student through series of lessons. Performance is recorded and quantified. The user has a significant amount of control and can explore and discover to match his/her own learning strategies and techniques. A teacher can at any time request a report on performance and subjectively alter the learning strategy and movement for the student. Still further, software allows as an option the ability for a teacher or instructor to customize lessons for individualized students.

The invention therefore presents a learning training system which allows the efficient utilization of teacher or expert supervision, while presenting to a user a learning training tool for intense, long period, repetitive learning tasks which conforms to the learning styles of the individual and therefore is more likely to be motivating and pleasurable to utilize.

The invention has a number of options or enhancements that will be discussed in more detail later.

DESCRIPTION OF THE DRAWINGS

FIG. 6A is a collection of screen display examples for varying attributes according to the preferred embodiment.

FIG. 7 is a display and legend key for the various auditory visual levels for either identification tasks or discrimination tasks.

FIGS. 8A–8F are screen displays for the various auditory visual levels for discrimination tasks as set forth in FIG. 7.

FIG. 9 is a display of the various strategy types for the preferred embodiment.

FIG. 13 is a screen display for selecting a speech perception level for a user.

FIGS. 14A–14D are screen displays for selecting lesson levels for a user.

FIG. 15 is a screen display for selecting a task for a user.

FIG. 16 is a screen display for selecting a strategy for a user.

FIG. 17 is a screen display for selecting a level of audiovisual support for a user.

FIG. 18 is a screen display for selecting specific tasks for a user.

FIG. 19 is a screen display for selecting certain parameters for testing a user.

FIGS. 20A–20L are screen displays relating to creating a user file for an individual user.

FIGS. 21A–21J are examples of various screen displays for different perception tasks according to the preferred embodiment of the present invention.

FIGS. 22C and 22D are examples of user report menus and report generator menus according to a preferred embodiment of the invention.

FIGS. 22F–22H are examples of data output, output calculations, and output reports according to the preferred embodiment of the present invention.

DETAILED DESCRIPTION OF PREFERRED EMBODIMENT

A. Overview

Figure 1:
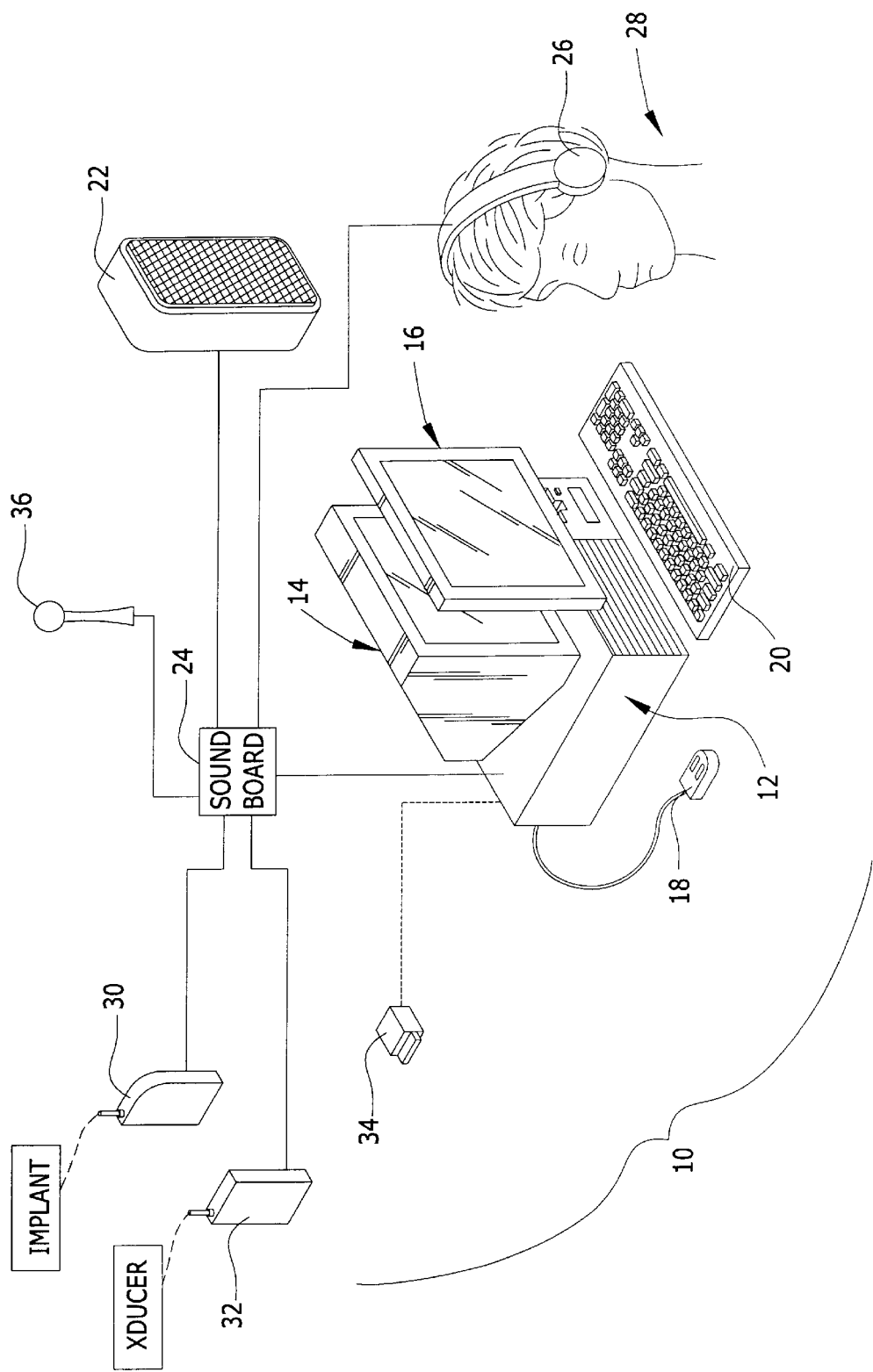
FIG. 1 is a block diagram of the hardware components for a preferred embodiment according to the present invention.

To assist in a better understanding of the invention, a preferred embodiment will now be described in detail. It is to be understood that this preferred embodiment is but one form the invention can take and is not exclusive of the forms that are possible.

The drawing figures will be referred to throughout this description. Reference numerals and/or letters will be used to indicate certain parts or locations in the drawings. The same reference numerals will be used to indicate the same parts or locations throughout the drawings unless otherwise indicated.

B. General Environment of the Preferred Embodiment

The example given by this preferred embodiment is particularly relevant to the teaching of young children (kindergarten or first graders) and/or children with hearing loss (either total or partial), or children with other types of perception impairments, such as learning disabilities. It is therefore to be understood that the concepts discussed would be by analogy applicable to any learning training, regardless of age, capabilities, or impairments; and particularly to learning of rule-based systems such as speech, reading, language (English and others), math, and the like.

As will be described in more detail below, the preferred embodiment entails a computer-based interactive system. In the above described environment with regard to learning by relatively small children, a teacher or speech/hearing professional is generally involved to initialize and monitor the training. However, the invention certainly can be used at home by non-technically trained persons.

Still further it is to be understood that the specific example discussed has some subtle concepts which are generally well known to those in this art, although some will be brought out here to assist those relatively unskilled in the art. First, the learning training discussed is many times very fundamental and highly repetitive. For example, a deaf child trying to distinguish between the sound of a one syllable word and environmental noise such as a car horn or a dog bark, must start at a very fundamental level. The student would be given intensive repetitive tests where the stimuli were simple one syllable words compared to non-speech sounds. Through long period, repetitive training, the child will begin to distinguish the same. This will lay the foundation for movement to more difficult differentiations; for example multi-syllable words or sentences compared to multi-syllable words or sentences of different makeup. One of the main advantages of the present invention is to allow such sometimes tedious, intensive work to be marshalled autonomously by the computer system while maintaining a level of motivation and interest in the user. This allows the teacher, professional, or parent the ability to ration their attention, while maintaining the interest of the user, and in fact, providing the user with the level of difficulty needed for the user's particular needs.

The following description will be broken down into these segments. First, a basic discussion of a preferred hardware system will be set forth. Thereafter, a high level description of the software of the preferred embodiment will be given. This will be followed by a specific discussion of various fundamental concepts utilized in the system. Thereafter a specific example of operation of the system will be set forth with reference to various examples of data and stimuli that are useful for these purposes. Finally, a discussion of options, alternatives, and features of the invention will be given.

C. Hardware

FIG. 1 diagrammatically depicts a basic hardware setup according to the preferred embodiment of the invention. What will be called collectively system 10 includes a computer processor 12 which is preferably an IBM or IBM compatible 386 microprocessor with four megabyte RAM and an 80–100 megabyte hard drive capacity. System 10 can work with a minimum of a 286 microprocessor with 640 K-RAM and 60 meg hard drive. For institutional use a 386 DX/25+, 8 mega byte RAM, 100–200 megabyte hard disk is recommended.

An EGA-VGA adapter and monitor 14 are preferred as the visual display component of the multi-perceptual system 10. Monitor 14 comprises a part of what will be called the user interface to system 10 which includes not only monitor 14 for presentation of visual stimuli and information readout, but also a user input that can consist of either a touch screen 16 (Edmark Corporation Touch Window) available from a variety of vendors; a mouse 18, such as is well known in the art; or a keyboard 20. In the preferred embodiment all three components can be used to facilitate not only user input but also operation of the programming and entry of data.

A sound stimuli component for the user interface consists of a speaker 22 (in the preferred embodiment a bookcase size speaker) that is interfaced to processor 12 by a Covox sound board available from Covox, Inc. 675 Conger Street, Eugene, Oreg. 97402 (see reference numeral 24). Optional components related to auditory stimuli can include standard head phones 26 placeable on user 28; or a cochlear input selector 30 which is attachable to a cochlear implant in a user; or a vibrotactile device 32 which is connectable to a vibratory transducer that could be used by a user. A microphone 36 can also be included.

As is known to those skilled in the art, each of those auditory components could be used for presenting sound to a user. Speaker 22 and headphones 26 would present sound as is normally understood; whereas the cochlear implant and vibrotactile devices would present it in a electrical or vibrational mode to those who are deaf or have a hearing impairment.

FIG. 1 also shows security key disk 34 (from Dallas semiconductor), such as is well known in the art, is useful in limiting access to system 10. System 10 will not operate unless the key disk 34 is inserted, for example, in the parallel port on processor 12. Furthermore, it can contain initialization information regarding the user which can facilitate easy start up and use of system 10. An alternative is to require users to utilize a pass word which is keyed in on keyboard 20.

It is further noted that in the preferred embodiment, a comprehensive manual would be given to the user of system 10 to assist installation of the programming, hookup of the hardware, and initialization and use for a variety of users and purposes.

D. Software Configuration

Figure 2:
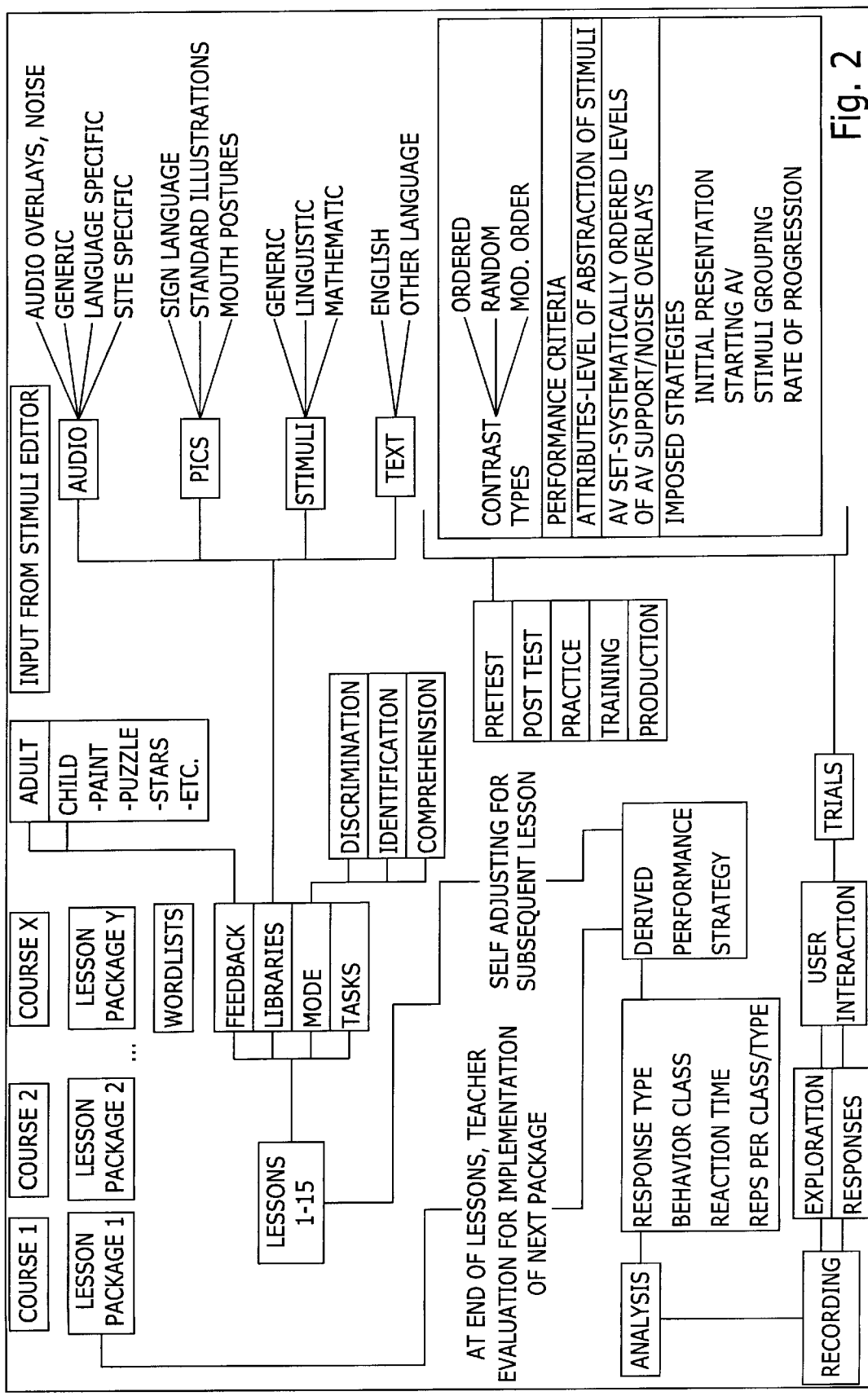
FIG. 2 is a block diagram of the overall architecture of the software of FIG. 2.

FIG. 2 depicts diagrammatically the high level structure of software according to the preferred embodiment of the present invention, and its use of memory.

The software runs on MS-DOS and is written in Turbo C and C+ language.

A floppy disk is supplied with the programming and is installed into computer 12 as is conventional and within the skill of those of ordinary skill in the art. For example, floppy would be inserted into drive A, the enter key pressed, and INSTALL typed in and again the enter key pressed. Approximately 4 megabytes of space are needed in RAM and 60–80 meg on the fixed drive for the program and at least 15 files must be set up. If a printer is utilized it should be connected to the LPT1 port. By following the instructions on the screen, completion of installation of the programming can be accomplished. After these basics are installed, audio, picture, and stimuli library and supporting executables are installed in a similar manner.

What is called the core stimuli for the programming are approximately 1600 words, sounds, pictures, and the like which form the basis for the training lessons presented with system 10. These core stimuli have been carefully selected on the basis of years of research and study, but system 10 allows the addition of customized stimuli. For example, it is known that personalized information allows better and quicker learning. Thus, picture stimuli that have a personal connection to any learner, (including small children) can be added to the core stimuli according to known in the art methods. Likewise words, sounds, and other stimuli can be added in.

As will be discussed in more detail later, different courses can be offered with system 10. In this preferred embodiment, a course on listening will be described. Different courses on listening, or courses dealing with pre-reading and reading subject matter can be separately installed and utilized. As previously mentioned, courses on mathematics, geography, and the like could also be prepared.

As will be further described below, memory also contains a plurality of different lessons for each specific course to allow variety for the user as well as varying levels of difficulty. In the preferred embodiment approximately 1000 lessons are utilized.

E. Software Overview

By referring to FIGS. 2 and 3A–3D a high level diagram of the construction and interrelationship of the software according to the preferred embodiment is shown. As previously explained, various courses would be possible. In this embodiment course 1 dealing with listening is specifically discussed.

Under each course is a plurality of lesson packages. Each lesson package (in the preferred embodiment approximately 160 lesson packages) would involve between 1 to 15 lessons. System 10 has about 1,000 lessons available to it.

For the listening course each lesson would generally contain one or more word lists. In this context word lists can mean words, combinations of words, sentences, non-speech sounds, or any auditory stimuli.

As shown at FIG. 2, the lessons can also consist of feedback, libraries, mode, and tasks.

Therefore, when operating system 10, a user, teacher, parent, or professional, can select from a number of different lesson packages related to the specific learning training desired for the user. As can be appreciated, the content of the lessons can cover wide variation of subject matter.

FIG. 2 specifically sets forth what is involved with each possible component of a lesson.

First of all, tasks consist of one or more of pretest, posttest, practice, training, and production. Specific examples of these will be given later. Basically the lesson can predetermine whether the user is prepared for the level of difficulty of the lesson using a pretest. It can also posttest the student to better check what has been learned. A practice component can allow the user to familiarize him or herself with the particular task. The term training refers to the actual learning process.

A production task involves a variety of tests or processes aimed at requiring the user to essentially produce a result. The production task may differ substantially from the training and is incorporated as an optional feature to go along with the listening training. One example is to have the student vocalize a word or try to match the word as sounded by system 10.

The term "Mode" in the preferred embodiment means selection between essentially a discrimination task or an identification task. A discrimination task merely asks the user to state whether two presented stimuli are the same or different. Identification tasks present a stimuli and then ask which of two or four succeeding stimuli matches the original stimuli. A comprehension mode is also possible which presents the stimuli and then requires language comprehension to select the answer.

The "libraries" portion of each lesson relates to the specific audio visual presentations that will be available in the lesson. As can be shown, audio, pictorial, and text are either taken from pre-stored core stimuli, or as indicated by the box labeled "input from stimuli editor", can be customized and input for use. Still further, the edit feature allows editing of the existing core stimuli.

As is also shown in FIG. 2, textual stimuli are coded into the libraries so that essentially the difficulty of their presentation can be quantified in valuing the difficulty of certain lessons. This will be discussed further below.

The feedback component of the lessons simply is any number of built-in presentations that provide reinforcing feedback and motivation to the user of system 10. For example, a child could be rewarded periodically with a puzzle, stars, or a painting task. Older children or adults could be rewarded with something at perhaps a higher level such as a text message.

FIG. 2 also shows that an important aspect of the software is the "strategy" for the tasks and for the lesson packages of the course. In the lower right hand corner of FIG. 2, it is shown that either by customized selection, or by default settings programmed into the software, such things as ordered or random presentation of stimuli for each lesson can occur, certain performance criteria can be adjusted for each user, the level of abstraction of stimuli can be adjusted, rate of progression, and the amount of audio visual support for each task can be selected.

The strategy therefore can essentially set the initial difficulty of each lesson and then the rate of progression as far as difficulty from then on.

In the preferred embodiment, as shown in FIG. 2, software allows recordation and analysis of the entire response profile of the user for each lesson or lesson package. As will be described in more detail later, the reporting not only simply records right or wrong answers, but also codes each answer with a value correlated to the meaning of the learning strategy of the user. It also records reaction time and other criteria, other than simply the right or wrong answer. From this reporting is derived a performance profile which is compared to the performance criteria and imposed strategy. System 10 can then either autonomously (or ask the teacher or professional to) evaluate the performance and select a change in strategy (either more difficult or less difficult) or remain the same. Additionally, as the tasks are proceeding, system 10 autonomously and dynamically can change the difficulty of the tasks based on performance. The change is not necessarily isolated to the stimuli presented, but rather can vary across such subtle matters as changing the amount of time for each task, changing the level of acceptable success or failure rates, providing less or more supplemental information with which to contemplate an answer, or allowing more repetitions of certain tasks.

It is to be understood that the system is very flexible in this aspect but provides the advantage of dynamically, on the fly, monitoring a user's progress and then adjusting one or more of these sometimes subtle criteria to in turn adjust presentation of the tasks and allow the user to not only go at his/her own speed, but to discover and explore and to find his/her own best learning strategies.

Figure 3A:
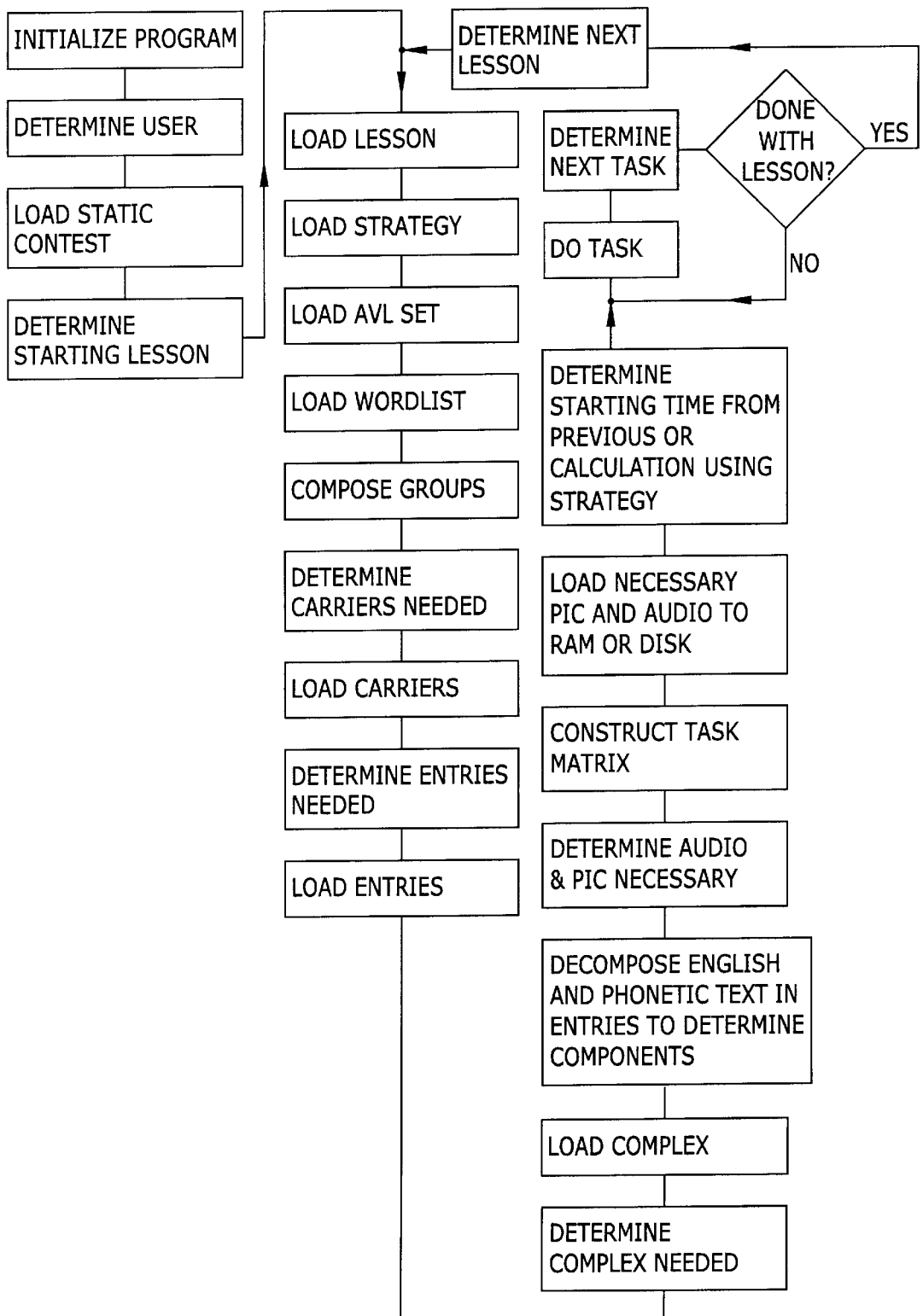
FIGS. 3A–3D are Flow charts of portions of programming related to the preferred embodiment.
Figure 3B:
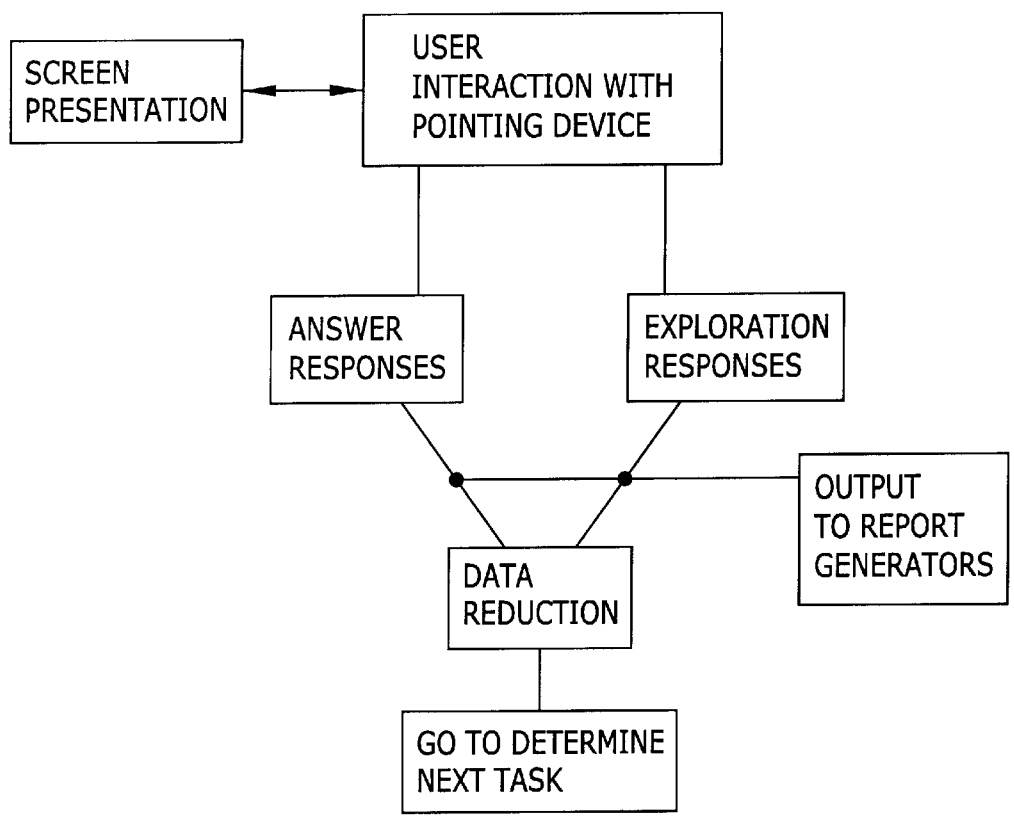
Figure 3C:
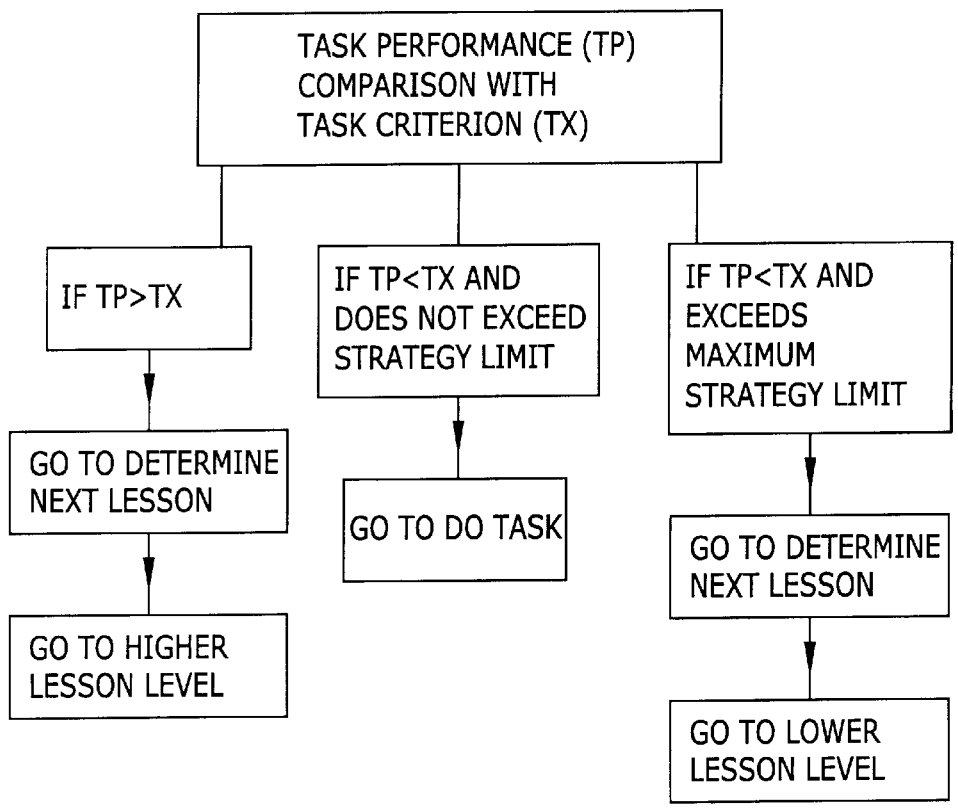
Figure 3D:
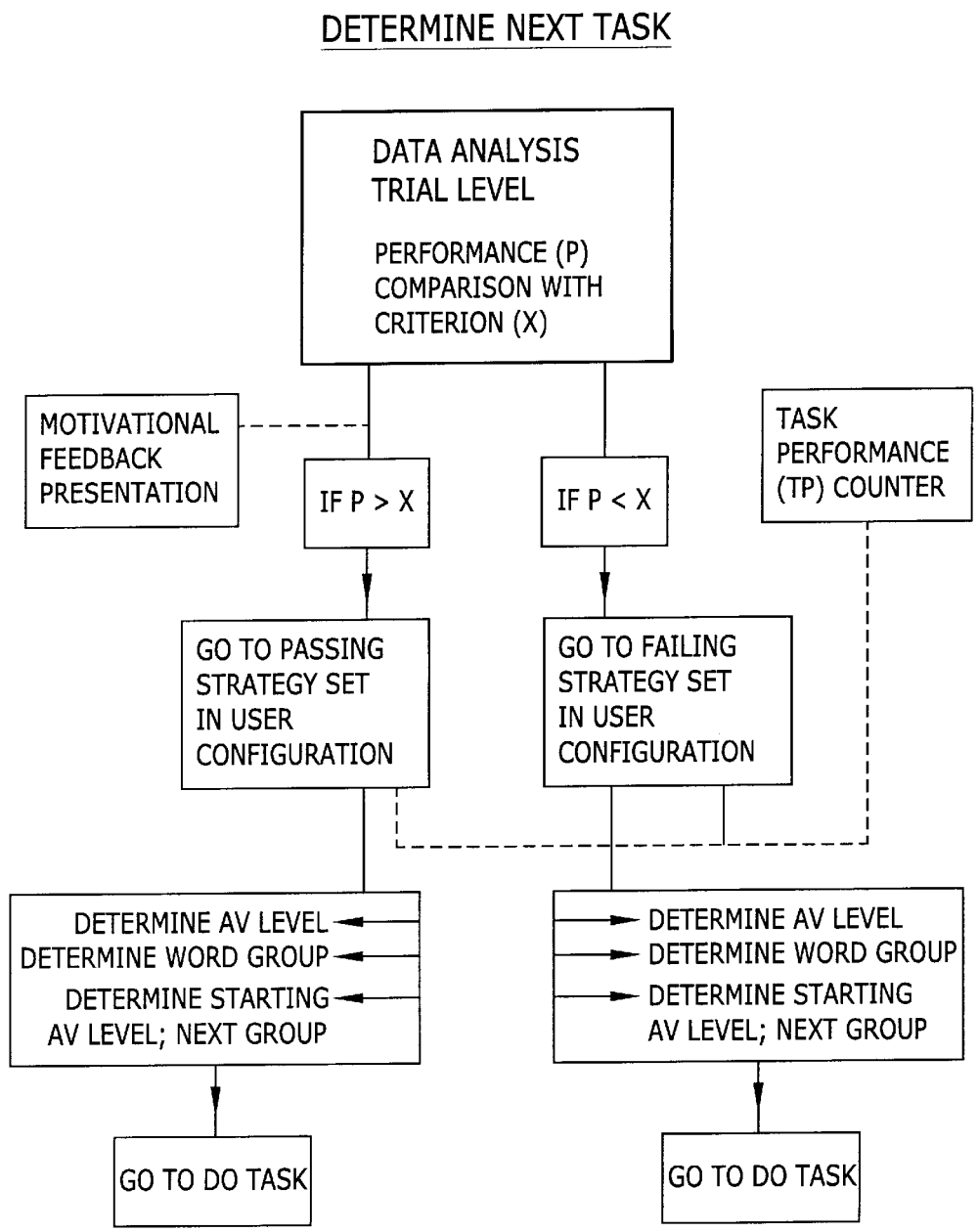
Figure 4A:
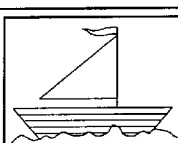
FIG. 4A is a diagram of the general format for screen displays for training tasks regarding the preferred embodiment of the invention.

FIG. 4A shows the basic flow of the program, including initialization and how the computer sets up tasks. FIG. 3A shows the basic method of "DO TASK" from FIG. 4A. FIG. 4C shows how performance is quantified to raise or lower next lesson difficulty; while FIG. 4D does this for next task.

F. Training Task Displays

Figure 4B:
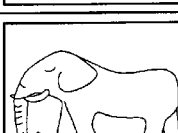
FIG. 4B is a specific screen display for a discrimination task according to the preferred embodiment of the invention.
Figures 4C, 5:
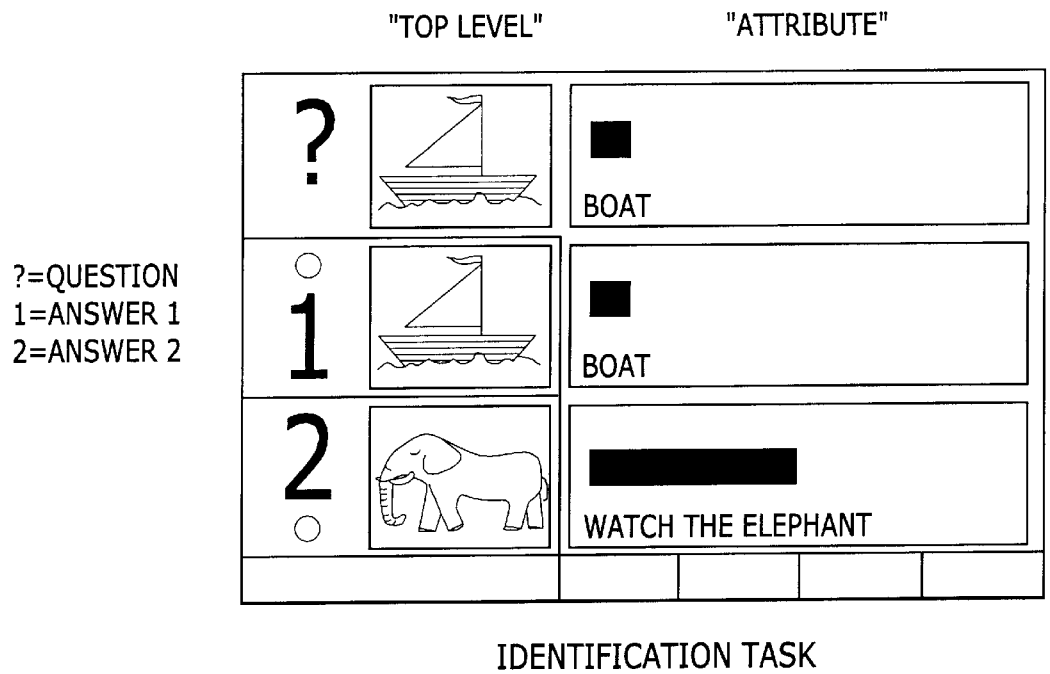
FIG. 4C is a specific example of a screen display for an identification task for the preferred embodiment of the invention.
FIG. 5 is a screen display providing an example of a word list for the preferred embodiment.

FIGS. 4A–4C provide examples of the type of display that would appear on the user's screen during a training task. In FIG. 4A, the basic template for a screen display task is shown. It is important to understand that in the preferred embodiment, these templates are uniform for all tasks. The left-most column are called "top level" spaces. This is where the stimuli being compared by the user is identified. The boxes to the right of "top level" are called "attributes" and as will be further seen below, basically are features, characteristics, or sub-parts of the top level stimuli. It is important to understand that the attributes may or may not be available for review by the user in certain testing levels. If the testing is more difficult, attributes which would allow one to explore and discover more about a stimuli may not be available to make the task more difficult.

As is also indicated at FIG. 4A, the lesson name would be displayed along with the name of the current user. The trial counter segment could be a linear bar having various segments which would represent to the user the number of trials before any successful completion of a task.

Therefore, top level presentations relate to a whole stimulus, whereas the attribute sections are a presentation of a whole stimulus or abstractions of the whole stimulus. FIGS. 4B and 4C give concrete examples. For discrimination tasks FIG. 4B shows that in a touch screen situation the first top level stimulus would be presented. The user would then review the bottom top level stimulus when presented and consider whether they are the same ("S") or different ("D"). If the user believes he/she knows the answer, the S or D would be. Depending on the level of difficulty of the particular lesson, an attribute (in this case the abstraction consisting of the relative length of the word of the top level stimulus is displayed). "Boat" has a very short black bar. "Watch the elephant" has a relatively longer black bar. This helps the user in their discrimination between stimuli.

FIG. 4C shows an identification task. To the right of the question mark would be presented the top level stimuli. To the right of "1" and "2" would be presented the options for matching with the "!" stimulus. Again, attributes could be displayed to assist in the task. The user could be exposed to only attributes at either stimulus or response levels, and/or only whole stimuli at the other level, in order to force synthesis of the parts or analysis of the whole.

It is to be understood that the software allows the user to replay either the top level stimuli to encourage exploration of auditory information. The user is never penalized for requesting repetitions prior to selecting an answer. The user can also replay the attribute information and explore the variety of receptional information available before making a selection.

G. Word Lists

FIG. 5 shows an example of a word list. The word list would be used for either comparing in discrimination tasks between the opposite words, or using them in identification tasks. In FIG. 5, each left hand column word is a one syllable mixed frequency word. Each right hand column word is a three syllable mixed frequency word. This word list would therefore be available for use by lessons which would contrast one versus three syllable words with similar frequency characteristics.

As can be appreciated, a wide variety of word lists are possible. At the end of this description are provided a number of examples of different types of word lists.

H. Different Attributes

Figure 6B:
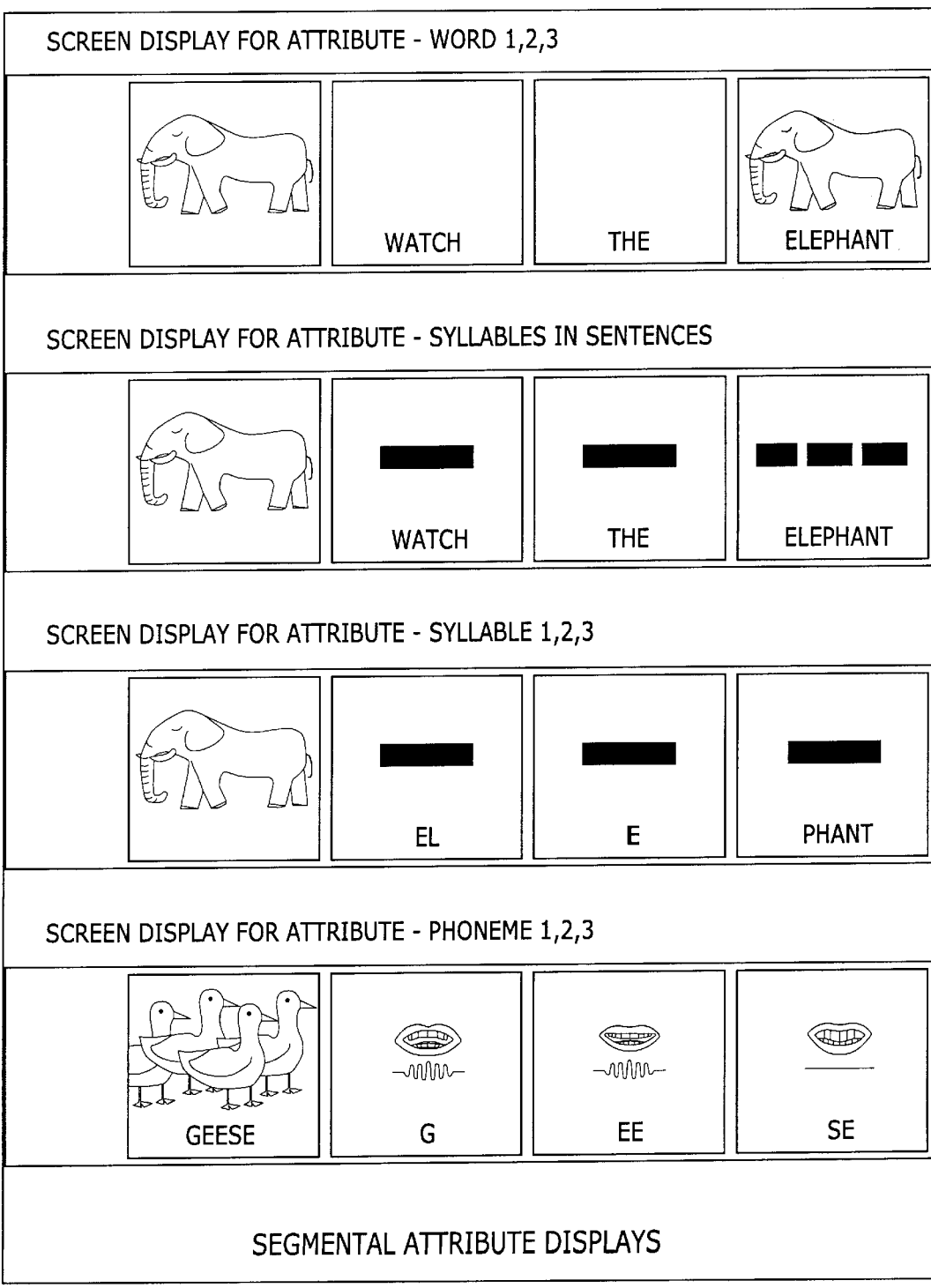
FIG. 6B is a further collection of screen display examples for attributes of the preferred embodiment.
Figure 8F:
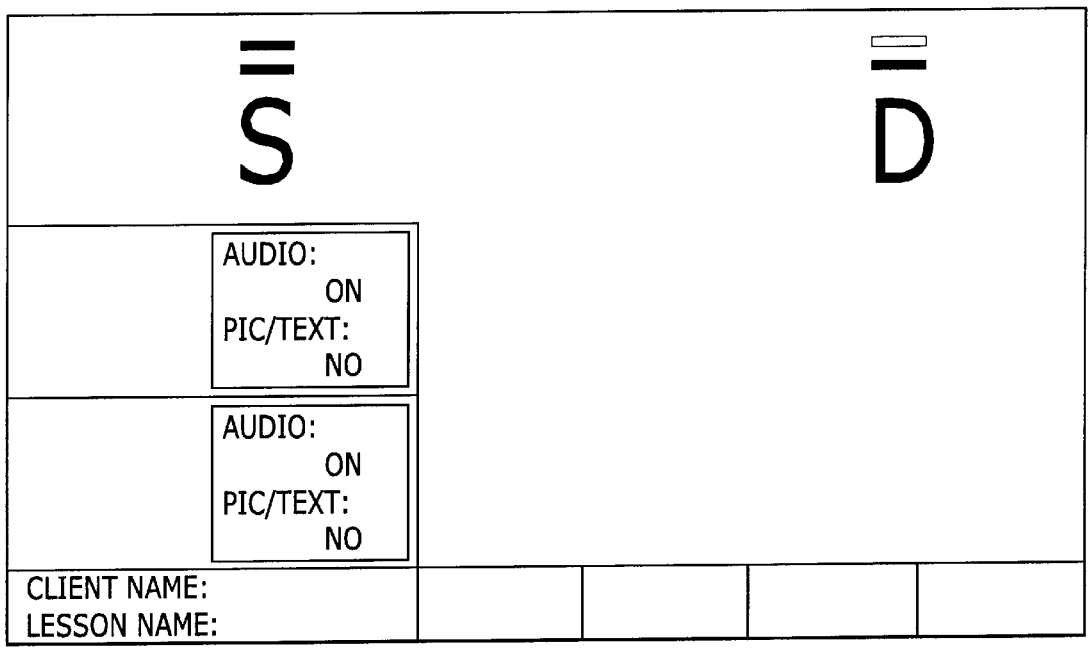

FIGS. 6A and 6B illustrate the different types of attributes available for certain top level stimuli. In FIG. 6A the top attribute is a non-speech attribute which indicates that the top level auditory stimuli in this instance is a frog croak and not a word. Such an attribute again would help the user in identifying and memorizing frog croak as a non-speech sound.

The second display indicates relative length of the phrase by use of a black bar. The third display shows as an attribute the syllables and each word of the phrase. The fourth display shows each syllable and the stress one would place when speaking each syllable.

FIG. 6B from top to the bottom shows what are called segmented attributes. For example, the words are included in separate boxes and a picture is associated with the descriptive word "elephant". Alternatively the different words are in separate boxes with syllables represented by bars that can be called up by the user to explore and investigate before answering. Thus can be seen there are even clues that can be programmed in for investigation by the user.

FIGS. 7 and 8A through 8F specifically shows AV levels for discrimination tasks. Those for identification tasks are similar.

I. Strategy

FIG. 9 provides a screen display for the various strategy types that can be selected by teacher or professional, or which can be built into default settings in the software. The user's progression or regression through a series of tasks and lessons is determined by his/her own performance and how that interacts with the general strategy selected for that user initially. As can be seen in FIG. 9, the strategy types are comprised of four elements namely (1) initial presentation (can be either "B" in which "both" stimulus and responses are displayed or "T" in which "target-only" initial presentations are displayed); (2) audio/visual set (either "A" which is auditory level only or "V" which includes visual and auditory levels); (3) type of word group (either same word group or different word group); and (4) rate of progression/regression (fast, medium, or slow).

J. Preview

Figure 10:
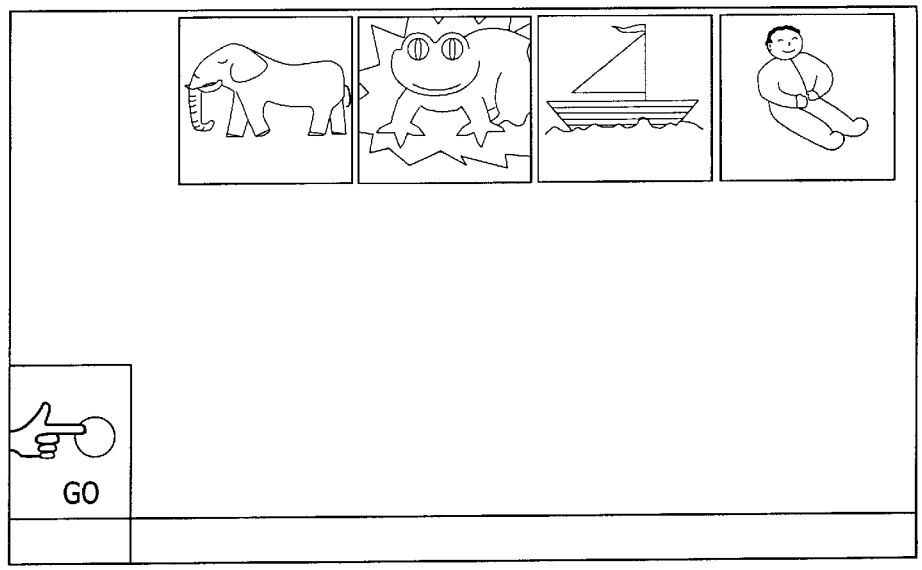
FIG. 10 is an exemplary screen display for a preview task.

FIG. 10 simply shows a screen display whereby samples of stimuli to be included in the following training tasks are shown to the user. Full auditory/visual support is provided and the user can request as many repetitions as desired. It is exploratory only and not task related.

K. Production Training

Figure 11:
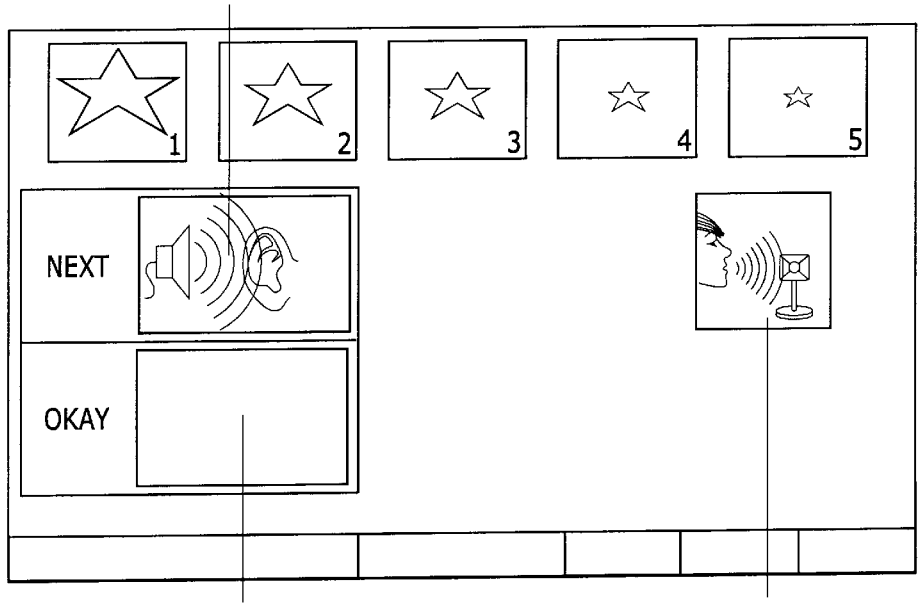
FIG. 11 is an exemplary display for a production training task.

FIG. 11 illustrates a production training task as indicated in FIG. 3. It includes three components: Listening, recording, and judging. The user can listen to a prerecorded stimulus just as if he/she were in the perception training tasks. Only one stimulus however serves as the model for production. The user can record and play back the stimulus and contrast it with the model prerecorded stimulus. The clinician or user can make a perceptual judgment about each of the user's productions by selecting one of five stars following each production. To advance to the next trial the clinician can select either "next" or "O.K.". Next represents an unacceptable production and "O.K." an acceptable production. Stars are shown for "O.K." and "balloons" for "next". The trial counter corresponds to the number of trials set and the user defaults. Stars will appear for "O.K." response.

The production training simply allows the user to practice vocalization of words or sounds, in this case, and to allow a teacher to evaluate such vocalizations.

L. Feedback

Figure 12A:
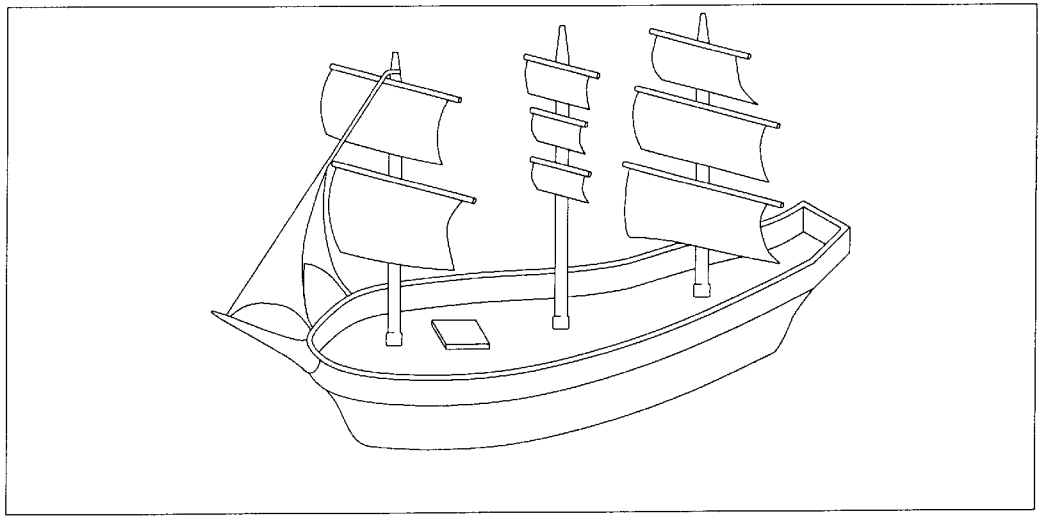
FIG. 12A is an exemplary screen display of a puzzle feedback.
Figure 12B:
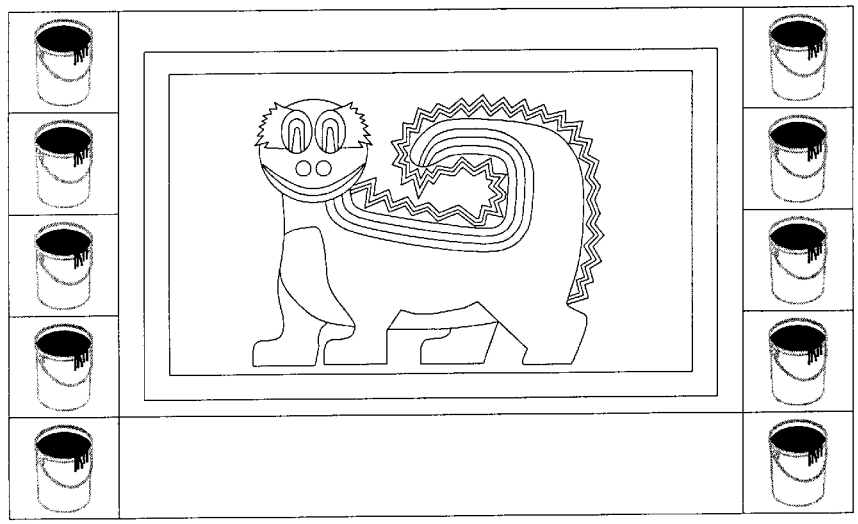
FIG. 12B is an exemplary display for painting feedback.
Figure 21A:
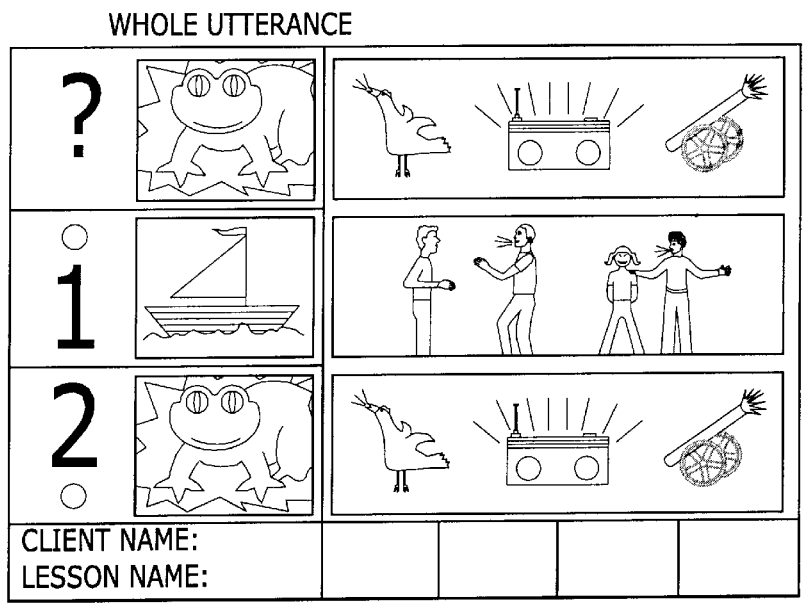
Figure 21B:
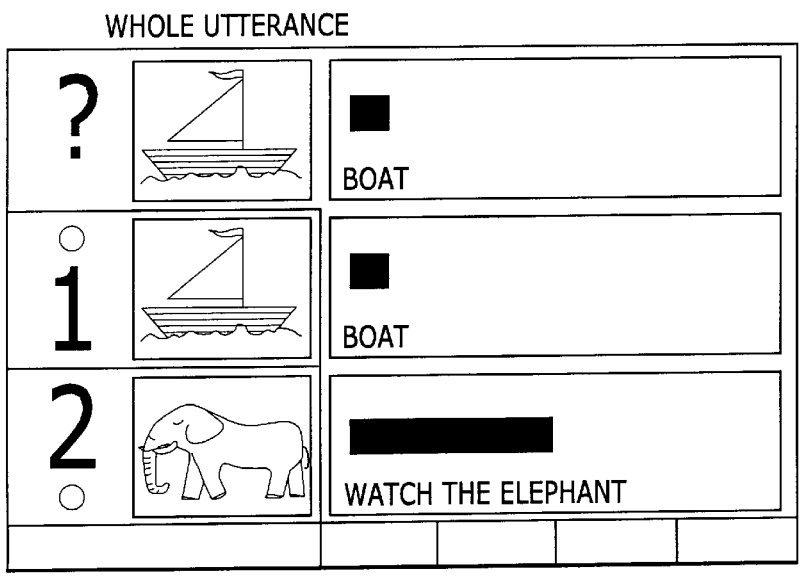
Figure 21C:
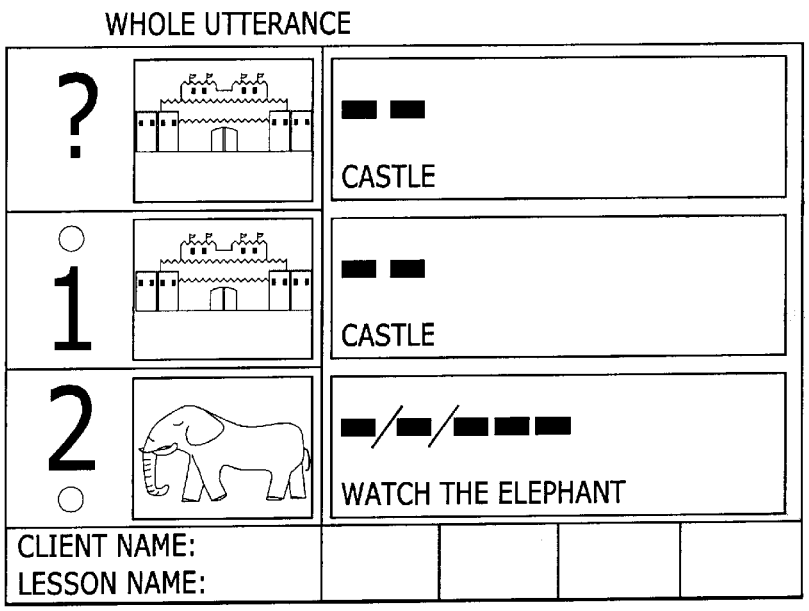
Figure 21D:
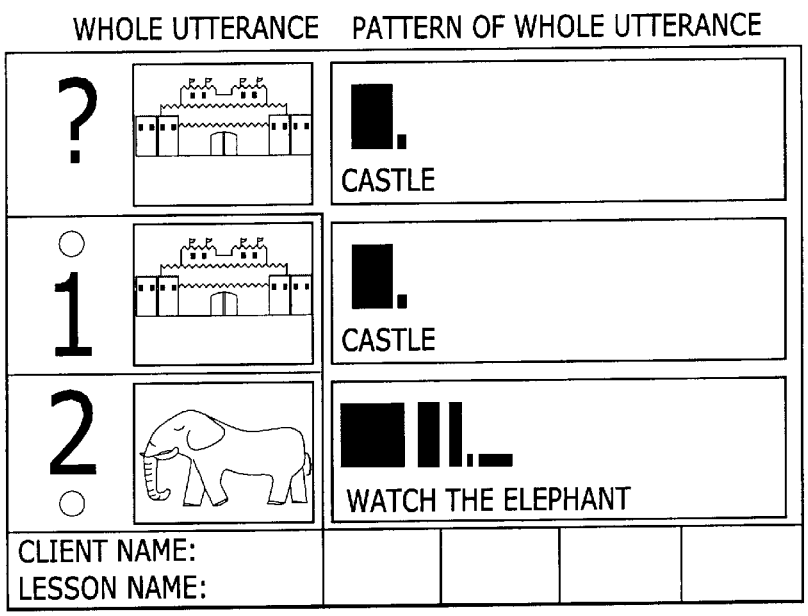
Figure 21I:
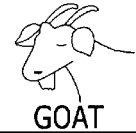
Figure 21J:
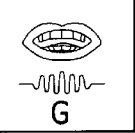
Figure 22A:
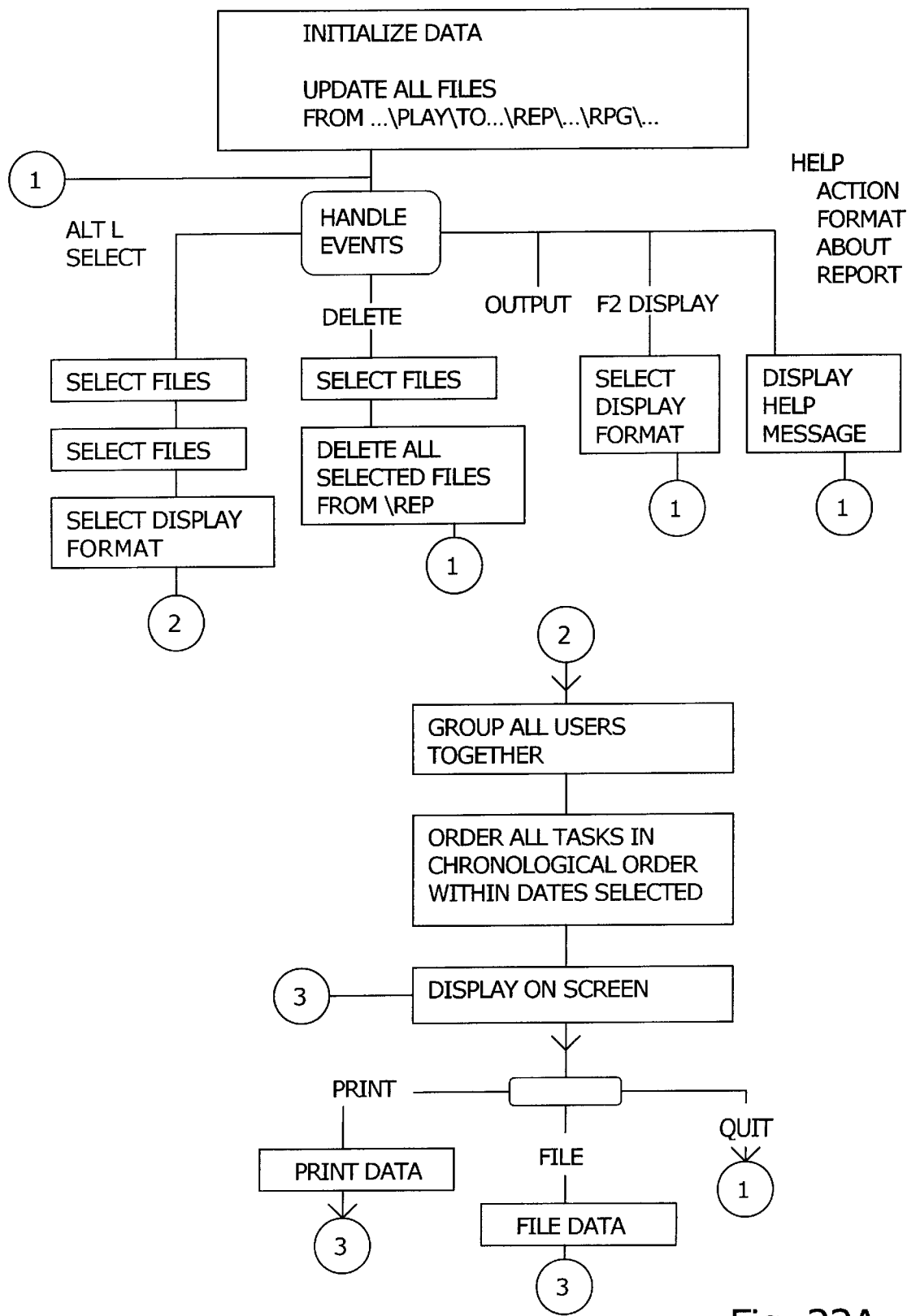
FIGS. 22A and 22B of flow charts for the user report process and report generator according to the preferred embodiment of the present invention.
Figure 22B:
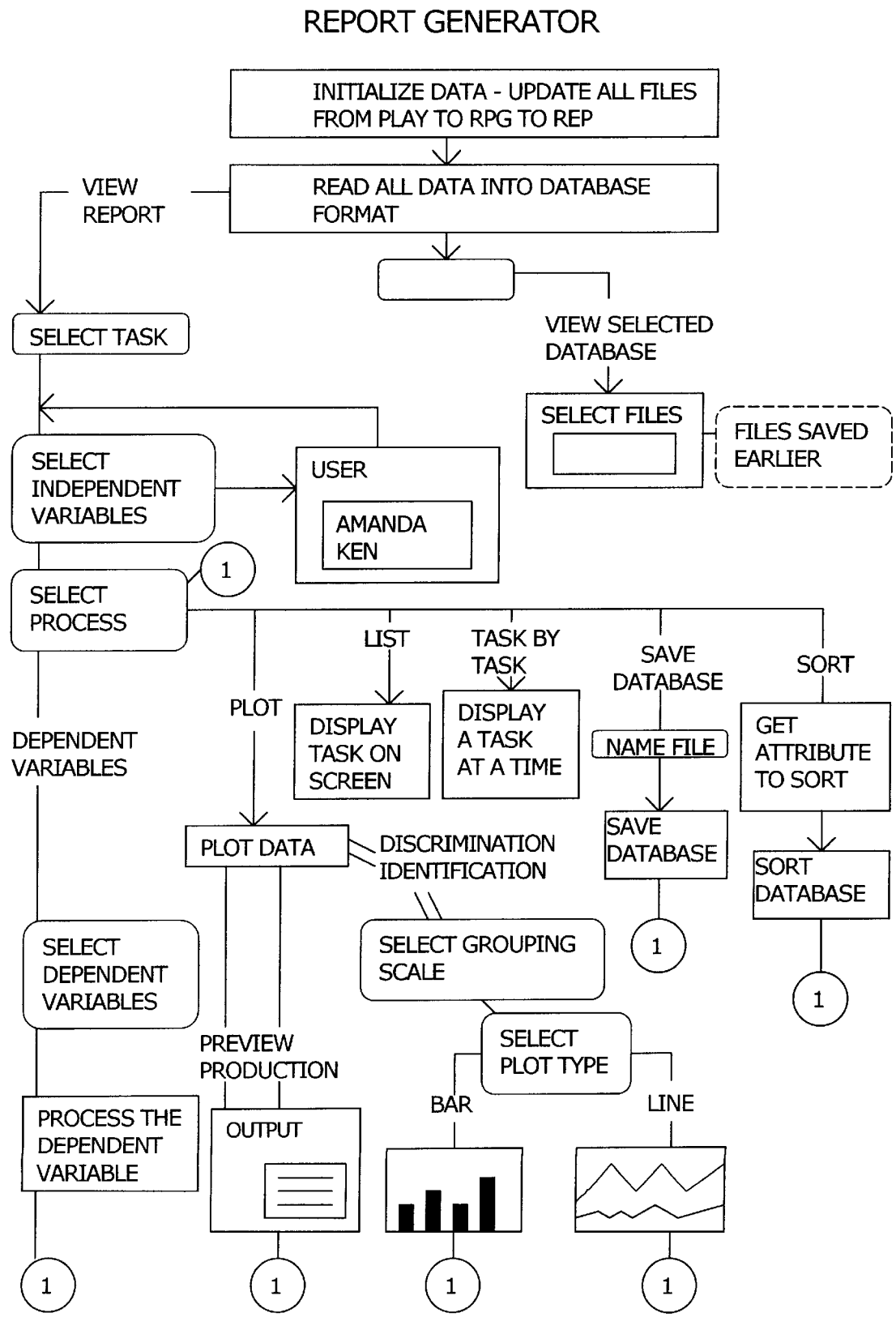
Figure 22E:
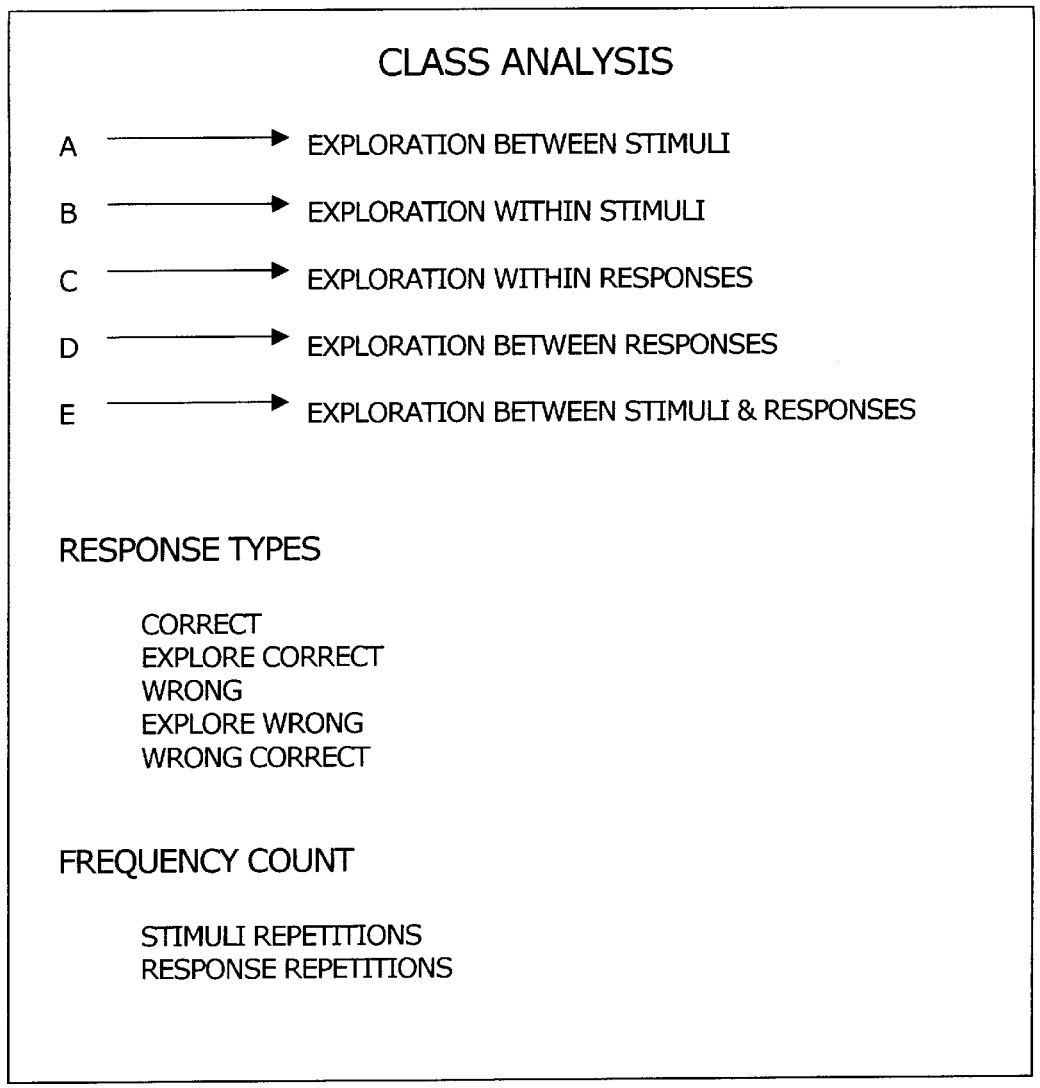
FIG. 22E is a chart showing class analysis, response types frequency count according to the preferred embodiment of the present invention.
Figure 23:
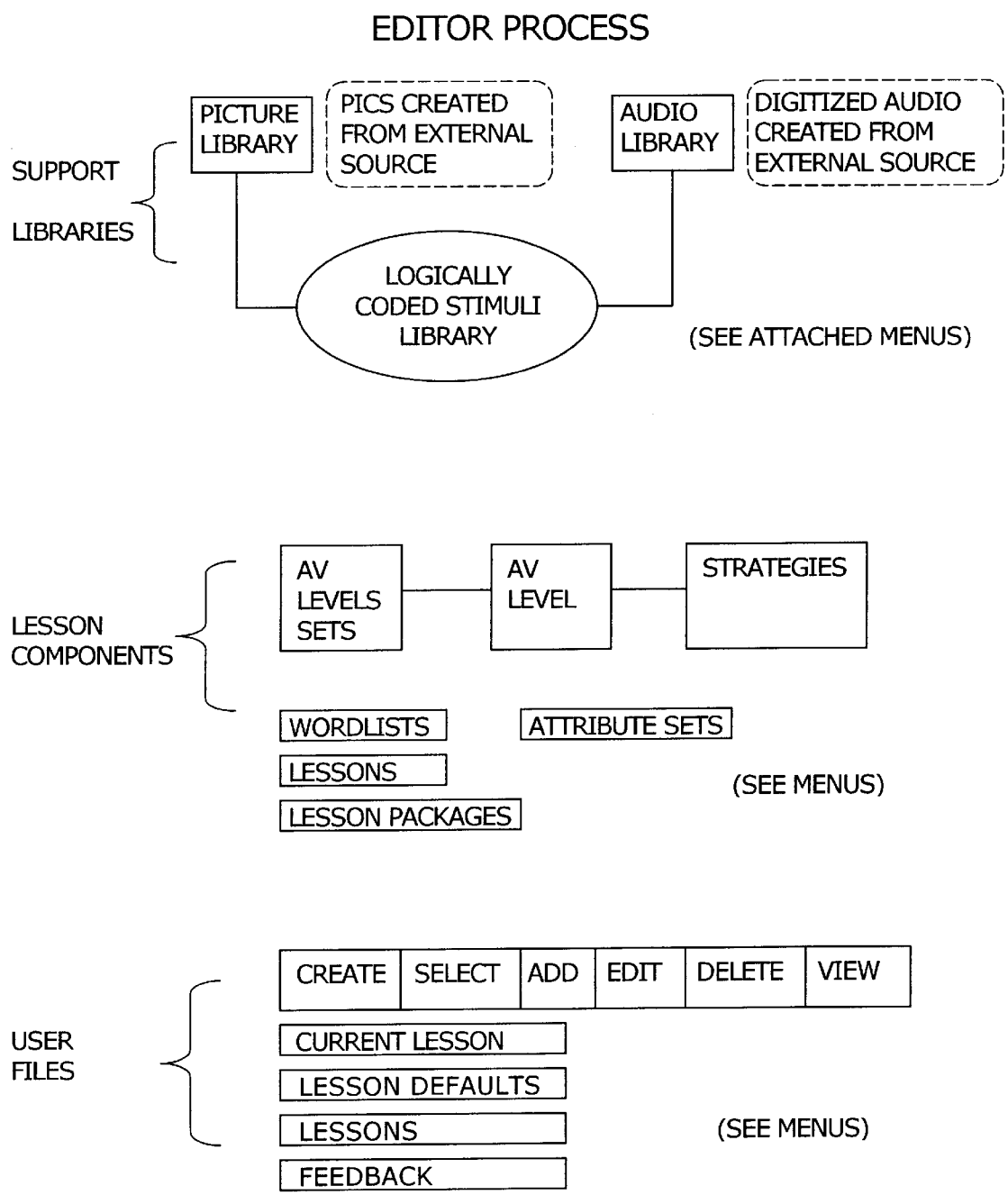
FIG. 23 is a block diagram of the editor process available with the preferred embodiment of the present invention.

As previously mentioned, FIGS. 12A and 12B show two specific types of what are basically rewards that can be programmed into the software. In the preferred embodiment the feedback options are tied into the success performance of the user in the task. For each successful or correct answer on the first try, the user would receive some sort of an indication in the trial counter box at the bottom of the screen. Then periodically the feedback display would appear. Based on the number of stars in the trial counter box, the puzzle feedback of FIG. 12A for example would break up a picture into the number of puzzle pieces which correspond to the number of stars received by the user. The user can then try to complete the puzzle using the number of pieces he/she has achieved. The number of pieces may or may not be selected to correspond to the number of first try correct answers, however. Such a puzzle is intended to try to provide motivation to the user to get as many first time correct answers as possible.

In FIG. 12B, a similar feedback is provided. The user is allowed to use different colors to paint the picture. The amount of time the user can spend painting and how frequently this occurs can be specified in each users file.

M. Initial Selection Options

FIGS. 13–19 show screen displays according to the preferred embodiment of the present invention which relate to initial selections for a user related to what level and strategy of tasking is indicated for the user. In FIG. 13, for example, the teacher or professional is presented with a series of YES or NO questions related to the indicted level of speech perception for the particular user. Depending on these answers, the teacher or professional is directed to other selection screens.

For example, regarding pattern perception, if the user is a very young child with a hearing deficiency, he/she may not be able to differentiate between speech and non-speech. If so, lessons and tasks within the lessons would have to start at a very basic level. If the child could differentiate accordingly, he/she may be able to start at a slightly higher level of lessons and tasks.

FIGS. 14A–14D show similar type questionnaires which further break down the questions regarding pattern, word, syllable, and perception; again further trying to identify the potential beginning level of tasks for the user.

FIG. 15 merely asks which task mode (discrimination or identification) is desired.

FIG. 16 requests selection of strategy for moving through lessons. The strategy is made by selecting one choice from each of the categories. For example, TVSMED would be "Target only" on initial presentation, "Visual O.K." if user can not perform the auditory only information, "Same group" for the tasks, and "MEDium rate" of progression.

FIG. 17 shows the selection of the level for AV support, as previously described regarding FIG. 7.

FIG. 18 then asks which of the specific tasks between pretest, preview, training tasks, production tasks, and posttest tasks are desired.

Finally, FIG. 19 allows default settings to be made for each user relating to feedback, tasks, and libraries for AV settings.

It can therefore be seen that a wide variety of flexibility is given to both customize or individualize training for each individual, as well as present different learning strategies for each individual.

N. Operation

The basic components and concepts of system 10 have been provided above. An example of an operation of system 10 will now be set forth.

By referring to FIGS. 2, 3, and 20A–20L, initiation and preparation for operation of system 10 can be seen. Initially a user file must be created for each person using system 10. The operator would access the editor in the software by selecting EDITOR from a menu manager (see FIG. 20A). A series of editor menus will appear (FIG. 20B) Key F4 should be selected to add a user. As shown in FIG. 20C, one could copy the user profile for an existing user or by so indicating create a new user profile.

Certain basic information is then entered including user name (FIG. 20D in the preferred embodiment up to eight characters long). Thereafter (FIG. 20E) certain information is then requested. In this Fig., feedback defaults are shown. These can be changed by moving the cursor to those values pressing back space and entering new values or by pressing a space bar to toggle between available settings.

Next the user default screen should be configured (see FIG. 20F). The entries to the questions presented in the user default screen can be answered based on a previously described options that are available for each user. When completed, this user default screen will be preserved for each of the lessons that are built for that user.

Thereafter, a lesson plan is created (see FIG. 20G). This lesson screen can be completed either by (1) selecting existing lesson packages by pressing F5, (2) selecting existing lessons from the lesson library by pressing F2, or by (3) entering new lesson components for task mode, word list, attribute, strategy and starting AV level. Thus up to 15 lessons can be selected and can be either selected by default or customization. As shown in FIG. 20H, if answered YES, the screen of FIG. 20I, for example, would appear which would produce default settings specific to the user and not the existing lesson defaults.

FIG. 20J shows an example of how one would customize a word list.

FIG. 20K shows how one would select a strategy. Again, strategy defines a rate of advancement and direction of movement through specified lessons.

Finally, FIG. 20L, an attribute set can be brought up on the screen and selected for a specific lesson. Only one attribute type per lesson can be chosen.

Other selections would then be made available for customization or default selection:

Starting A/V level: This option specifies the A/V level setting for displaying the stimulus during the training task.

Preview: This YES/NO option controls whether the user is given a preview of the stimuli prior to the training task. This option may be used to insure the stimuli are in the user's vocabulary before entering the task.

Training: This YES/NO option controls whether the user engages in the perception training tasks.

Task Pass Percent: Determines the percent correct needed to pass to next training task. Default value is 75%.

Pretest: This YES/NO option controls whether users are given a pretest before receiving training. Pretest value can be compared with training values and posttest values to document changes.

Posttest: This YES/NO option controls whether the users are given the posttest on completion of training for a lesson.

Reserve Testing Group: This YES/NO option is relevant only if the pretesting and/or posttest option is set to YES and controls whether content used during testing is or is not used during training.

Pretest Judgment: This YES/NO option is relevant only if pretest is selected. It controls whether a score obtained on pretest is used to place the user in a training series. The next two options "advance criteria" and "enter criteria" are used to set values for entering a training series based on the pretest score.

Advance Percentage: This option is relevant only if pretest is selected. The value entered determines when a user advances to the next lesson level. For example, if the value were set to 85% and the user obtained that score or better, the user would advance to the next lesson level for pretest rather than enter the training series.

Enter Percent: Relevant only if pretest is set to YES. The value entered sets the lowest acceptable limit for entering a lesson series. If the user can not obtain this entry score he/she will be moved back to a less difficult lesson level.

Production: A five choice option controls whether the user will be placed in a production task and if so when the production task will be sequenced in the training. Options include "none", "pretest", "posttest", "pre/posttest", and "group based". If "group based" is selected the production task would be given each time the user moves into a new contrast group.

Production A/V Level: This option specifies the A/V level setting for displaying the stimulus during the production task.

Method of Grouping Contrasts From Word Lists: This option controls the way in which groups or stimuli are chosen and contrasts are paired in a lesson. There are four ways of grouping and presentation. A contrast ALWAYS involves a stimulus item from each set. Stimuli within a set are never contrasted. The four choices illustrated below are preceded by an explanation of the terms used.

Training Contrasts: This option specifies a number of contrasts to be presented within a training task.

Reps/Training Contrasts: Option specifies a number of times each contrast is repeated within a training task. The total number of trials presented per task can be determine by multiplying the number of training contrasts with the repetitions per contrast. The total number within a task can not exceed twenty.

Enter the number at the cursor. The backspace or delete keys can be used to erase the current value.
(Trials=)

The number of total trials will appear after training contrasts and repetitions per training contrast have been specified. This value is dynamically derived by multiplying the two contrasts and repetitions. To change this value, one or both of the two preceding parameters must be changed.

Test Contrasts

This option specifies the number of contrasts to be presented within a pretest and/or posttest task.

Enter the number at the cursor. The backspace or delete keys can be used to erase the current value.

Reps/test Contrast

This option specifies the number of times each contrast is repeated within a pretest and/or posttest task. The total number of trials presented per task can be determined by multiplying the number of training contrasts with the repetitions per contrast.

The total number of trials within a task cannot exceed 20.

Enter the number at the cursor. The backspace or delete keys can be used to erase the current value.

Trials=)

The number of total trials will appear after test contracts and repetitions per test contrast have been specified. This value is dynamically derived by multiplying the contrasts and repetitions.

Enter the number at the cursor. The backspace and delete keys can be used to erase the current value.

Number of Screen Choices

This option specifies the number of answers available during a task. Either a two-choice or four-choice option is available.

Select either "2" or "4" by pressing the space bar.

Retries Per Trial

This option specifies the number of retries or chances the user has to select the correct answer before moving to the next contrast.

Enter the number at the cursor. The backspace or delete keys can be used to erase the current value.

Use Text

This option specifies whether text will be displayed during the task.

Select "Yes" or "No" by pressing the space bar.

Site Group

This optional feature specifies the library number of a special library established for specific site purposes.

Enter the number at this cursor. The backspace or delete keys can be used to erase the current value.

Picture Group

This option specifies which picture libraries should be used to display visual information. The choices are "Standard" "SEE 2", and "Oral". "Standard" refers to illustrated pictures. "SEE2" refers to Signing Exact English sign language and "Oral" refers to presentation of mouth postures. Only one picture group can be chosen per lesson.

Select the choice by pressing the space bar.

Audio Group

Standard English is the only audio group currently available.

Audio Overlay Name

This option allows background noise to be integrated into the audio signal. The default option is to leave the choice blank and have no overlay signal.

Select the overlay name by pressing F2.

Audio Overlay Level

This option controls the level of noise integrated into the audio signal. The value entered can range from 1 to 100, soft to loud.

Enter the number at the cursor. The backspace or delete keys can be used to erase the current value.

Once all of this is set up, the user can go into the lessons. Depending on what has been selected pretesting can be done to determine the position the student should start within the lessons. Once training starts, stimuli are presented according to the settings regarding A/V support, attributes, initial presentation, etc., and the user proceeds by answering, exploring, or discovering as previously discussed. Software constantly monitors the progress of the user and will adjust to his/her performance.

O. Appendices

By referring to FIGS. 21A–21J, different types of displays and contrast types are shown. Appendix A includes listings of the available lesson packages with one specific example of a lesson package for each of those types of contrasts.

It can be seen that wide variety of difficulty is possible.

Appendix B presents a printout of the menus for software to allow better understanding of the configuration of the software.

Appendix C sets forth examples of rules regarding coding of stimuli.

It is to be understood that this information is submitted in an attempt to disclose one way in which can be realized. The specific software code can be derived from disclosure of this preferred embodiment and is not essential to understanding of the invention. Substantial portion of one example of programming can be found at U.S. copyright registration TX529,929, registered Jul. 27, 1992 to Breakthrough, Inc., and is incorporated by reference herein.

It is to be appreciated that the invention can take many forms and embodiments. True essence and spirit of this invention are defined in the appended claims, and it is not intended that the embodiment of the invention presented herein should limit the scope thereof.

Speech and Nonspeech
N Lesson Packages

Lesson Package: N-SCREEN ..................................................................... N1

1. NLU1-1 ............... long uninterrupted v. 1 syl ................................................ N1
    2. NSUE-1 ............... short uninterrupted v. 5 syl sent ...................................... N1
    3. NLUSI-1 ............. long uninterrupted v. short interrupted ........................... N1
    4. NSUSU-1 ........... short uninterrupted v. short uninterrupted ..................... N2

Lesson Package: NONSPCH-1 ................................................................. N3

1. NLU1-1 ............... long uninterrupted v. 1 syl ................................................ N3
    2. NLU1-2 ............... long uninterrupted v. 1 syl ................................................ N3
    3. NLI1-1 ................. long interrupted v. 1 syl .................................................... N3
    4. NLI1-2 ................. long interrupted v. 1 syl .................................................... N4
    5. NSU1-1 ............... short uninterrupted v. 1 syl .............................................. N4
    6. NSU1-2 ............... short uninterrupted v. 1 syl .............................................. N4
    7. NSI1-1 ................. short interrupted v. 1 syl .................................................. N5
    8. NSI1-2 ................. short interrupted v. 1 syl .................................................. N5

Lesson Package: NONSPCH-2 ................................................................. N7

1. NSUE-1 ............... short uninterrupted v. 5 syl sent ...................................... N7
    2. NSIE-1 ................ short interrupted v. 5 syl sent .......................................... N7
    3. NLUE-1 ............... long uninterrupted v. 5 syl sent ....................................... N7
    4. NLIE-1 ................ long interrupted v. 5 syl sent ........................................... N8
    5. NSUC-1 ............... short uninterrupted v. 3 syl sent ...................................... N8
    6. NSIC-1 ................ short interrupted v. 3 syl sent .......................................... N8
    7. NLUC-1 ............... long uninterrupted v. 3 syl sent ....................................... N9
    8. NLIC-1 ................ long interrupted v. 3 syl sent ........................................... N9

Lesson Package: NONSPCH-3 ................................................................. N11

1. NLUSI-1 ............. long uninterrupted v. short interrupted ......................... N11
    2. NLUSU-1 ........... long uninterrupted v. short uninterrupted .................... N11
    3. NLISU-1 ............ long interrupted v. short uninterrupted ......................... N11
    4. NLISI-1 .............. long interrupted v. short interrupted ............................. N12

Speech and Nonspeech Lessons
Attribute: Nonspeech/Speech
Pattern Perception

Lesson Package: N-SCREEN

NLU1-1
*long uninterrupted v. 1 syl*

| | |
|---|---|
| -mountain-stream | cake |
| -train-horn | knife |
| | |
| -birds-chirping | moon |
| -door-creaking | kite |
| | |
| -laughter | mop |
| -motorcycle | grape |
| | |
| -music | page |
| -pouring | bowl |

NSUE-1
*short uninterrupted v. 5 syl sent*

| | |
|---|---|
| -pop-pouring | Get the newspaper |
| -plane | See my family |
| | |
| -mixer | Watch the butterfly |
| -cannon-1shot | Get the parachute |
| | |
| -slidewhistle | See my eyelashes |
| -sneeze | Watch the waterfall |
| | |
| -rollercoaster | Wear the sunglasses |
| -hairdryer | Get the radio |

NLUSI-1
*long uninterrupted v. short interrupted*

| | |
|---|---|
| -mountain-stream | -bell |
| -thunder | -glass-breaking |
| | |
| -door-creaking | -goats |
| -tapwater | -knocking |
| | |
| -train-horn | -dog-panting |
| -music | -parking-meter |
| | |
| -traffic | -firecrackers |
| -baby-crying | -cloth-ripping |

ITS - LISTENING LESSON MANUAL

Length
L Lesson Packages

Lesson Package: L-SCREEN ................................................................... L1

1. LLU1-1 ............... long uninterrupted v. 1 syl ................................. L1
    2. LSUE-1 ............... short uninterrupted v. 5 syl sent ...................... L1
    3. L1E-1 .................. 1 syl v. 5 syl sent ............................................. L1
    4. L13-1 .................. 1 syl v. 3 syl ................................................... L2
    5. LBE-1 ................. 2 syl phrase v. 5 syl sent ................................ L2
    6. LDE-3 ................. 4 syl sent v. 5 syl sent ................................... L2

Lesson Package: LENGTH-1 ................................................................. L3

1. LLU1-1 ............... long uninterrupted v. 1 syl ................................. L3
    2. LLU1-2 ............... long uninterrupted v. 1 syl ................................. L3
    3. LLU1-3 ............... long uninterrupted v. 1 syl ................................. L3
    4. LLI1-1 ................ long interrupted v. 1 syl .................................... L4
    5. LLI1-2 ................ long interrupted v. 1 syl .................................... L4
    6. LLI1-3 ................ long interrupted v. 1 syl .................................... L4
    7. LSU1-1 ............... short uninterrupted v. 1 syl ............................... L5
    8. LSU1-2 ............... short uninterrupted v. 1 syl ............................... L5
    9. LSU1-3 ............... short uninterrupted v. 1 syl ............................... L5
  10. LSI1-1 ................ short interrupted v. 1 syl .................................. L6
  11. LSI1-2 ................ short interrupted v. 1 syl .................................. L6
  12. LSI1-3 ................ short interrupted v. 1 syl .................................. L6

Lesson Package: LENGTH-2 ................................................................. L7

1. LSUE-1 ............... short uninterrupted v. 5 syl sent ...................... L7
    2. LSIE-1 ................ short interrupted v. 5 syl sent ......................... L7
    3. LLUE-1 ............... long uninterrupted v. 5 syl sent ....................... L7
    4. LLIE-1 ................ long interrupted v. 5 syl sent .......................... L8
    5. LSUC-1 ............... short uninterrupted v. 3 syl sent ...................... L8
    6. LSIC-1 ................ short interrupted v. 3 syl sent ......................... L8
    7. LLUC-1 ............... long uninterrupted v. 3 syl sent ....................... L9
    8. LLIC-1 ................ long interrupted v. 3 syl sent .......................... L9

Length Lessons
Attribute: Duration
Pattern Perception

Lesson Package: L-SCREEN

LLU1-1
*long uninterrupted v. 1 syl*

| | |
|---|---|
| -thunder | comb |
| -birds-chirping | eyes |
| -motorcycle | night |
| -siren | leg |
| -music | hat |
| -baby-crying | broom |
| -train-horn | house |
| -traffic | sew |

LSUE-1
*short uninterrupted v. 5 syl sent*

| | |
|---|---|
| -mixer | See my eyelashes |
| -handsaw | Watch the elephant |
| -plane | See the magician |
| -cannon-1shot | Eat the potato |
| -zipper | Wear the sunglasses |
| -car-starting | See my typewriter |
| -hairdryer | Buy the tricycle |
| -pop-pouring | I want lemonade |

L1E-1
*1 syl v. 5 syl sent*

| | |
|---|---|
| bath | See my furniture |
| shoe | Watch the elephant |
| draw | Eat the hamburger |
| blow | Get the umbrella |
| hat | I want lemonade |
| leg | I eat spaghetti |
| fire | Wear the sunglasses |
| snow | See the restaurant |

ITS - LISTENING LESSON MANUAL

L1

*AH*

Syllable Number
U Lesson Packages

Lesson Package: U-SCREEN .................................................................. U1

1. U1L3H-1 ............ 1 syl low freq v. 3 syl high freq ......................................... U1
    2. U1B3B-1 ............ 1 syl mixed freq v. 3 syl mixed freq .................................. U1
    3. U1B2B-2 ............ 1 syl mixed freq v. 2 syl mixed freq .................................. U1
    4. U1H3H-1 ............ 1 syl high freq v. 3 syl high freq ....................................... U2
    5. U1L2L-3 .............. 1 syl low freq v. 2 syl low freq ......................................... U2

Lesson Package: SYLNUM-1 ................................................................. U3

1. U1L3H-1 ............ 1 syl low freq v. 3 syl high freq ......................................... U3
    2. U1L3H-2 ............ 1 syl low freq v. 3 syl high freq ......................................... U3
    3. U1H3L-1 ............ 1 syl high freq v. 3 syl low freq ......................................... U3
    4. U1H3L-2 ............ 1 syl high freq v. 3 syl low freq ......................................... U4
    5. U1L2H-1 ............ 1 syl low freq v. 2 syl high freq ......................................... U4
    6. U1L2H-2 ............ 1 syl low freq v. 2 syl high freq ......................................... U4
    7. U1L2H-3 ............ 1 syl low freq v. 2 syl high freq ......................................... U5
    8. U1B3B-1 ............ 1 syl mixed freq v. 3 syl mixed freq .................................. U5
    9. U1B3B-2 ............ 1 syl mixed freq v. 3 syl mixed freq .................................. U5
  10. U1H2L-1 ............ 1 syl high freq v. 2 syl low freq ......................................... U6
  11. U1H2L-2 ............ 1 syl high freq v. 2 syl low freq ......................................... U6
  12. U1H2L-3 ............ 1 syl high freq v. 2 syl low freq ......................................... U6
  13. U1B2B-1 ............ 1 syl mixed freq v. 2 syl mixed freq .................................. U7
  14. U1B2B-2 ............ 1 syl mixed freq v. 2 syl mixed freq .................................. U7

Lesson Package: SYLNUM-2 ................................................................. U9

1. U1H3H-1 ............ 1 syl high freq v. 3 syl high freq ....................................... U9
    2. U1H3H-2 ............ 1 syl high freq v. 3 syl high freq ....................................... U9
    3. U1L3L-1 .............. 1 syl low freq v. 3 syl low freq ......................................... U9
    4. U1L3L-2 .............. 1 syl low freq v. 3 syl low freq ......................................... U10
    5. U1H2H-1 ............ 1 syl high freq v. 2 syl high freq ....................................... U10
    6. U1H2H-2 ............ 1 syl high freq v. 2 syl high freq ....................................... U10
    7. U1H2H-3 ............ 1 syl high freq v. 2 syl high freq ....................................... U11
    8. U1L2L-1 .............. 1 syl low freq v. 2 syl low freq ......................................... U11
    9. U1L2L-2 .............. 1 syl low freq v. 2 syl low freq ......................................... U11
  10. U1L2L-3 .............. 1 syl low freq v. 2 syl low freq ......................................... U12

Syllable Number Lessons
Attribute: Number of Syllables
Pattern Perception

Lesson Package: U-SCREEN

U1L3H-1
*1 syl low freq v. 3 syl high freq*

| | |
|---|---|
| robe | wastebasket |
| bear | parachute |
| drum | saxophone |
| nose | grasshopper |
| lamb | applesauce |
| mad | spaghetti |
| red | butterscotch |
| green | octopus |

U1B3B-1
*1 syl mixed freq v. 3 syl mixed freq*

| | |
|---|---|
| shave | overalls |
| toad | ladybug |
| juice | tablespoon |
| snail | restaurant |
| tree | waterski |
| hill | moccasin |
| web | icicle |
| flea | pineapple |

U1B2B-2
*1 syl mixed freq v. 2 syl mixed freq*

| | |
|---|---|
| wood | button |
| ring | ostrich |
| brick | honey |
| seed | wreath |
| glass | hammer |
| drip | lemon |
| skin | needle |
| gum | radish |

ITS - LISTENING LESSON MANUAL  U1

*A6*

Stress Pattern
T Lesson Packages

Lesson Package: T-SCREEN ................................................................... T1

1. T1E-1 .................. 1 syl v. 5 syl sent ............................................................. T1
    2. T2E-1 .................. 2 syl v. 5 syl sent ............................................................. T1
    3. T3E-1 .................. 3 syl v. 5 syl sent ............................................................. T1
    4. T13-1 .................. 1 syl v. 3 syl ..................................................................... T2
    5. TBE-1 .................. 2 syl phrase v. 5 syl sent ............................................... T2
    6. TDE-3 .................. 4 syl sent v. 5 syl sent ................................................... T2

Lesson Package: STRESS-1 ................................................................... T3

1. T1E-1 .................. 1 syl v. 5 syl sent ............................................................. T3
    2. T1E-2 .................. 1 syl v. 5 syl sent ............................................................. T3
    3. T1E-3 .................. 1 syl v. 5 syl sent ............................................................. T3
    4. T1D-1 .................. 1 syl v. 4 syl sent ............................................................. T4
    5. T1D-2 .................. 1 syl v. 4 syl sent ............................................................. T4
    6. T1D-3 .................. 1 syl v. 4 syl sent ............................................................. T4
    7. T1C-1 .................. 1 syl v. 3 syl sent ............................................................. T5
    8. T1C-2 .................. 1 syl v. 3 syl sent ............................................................. T5
    9. T1C-3 .................. 1 syl v. 3 syl sent ............................................................. T5
   10. T1B-1 .................. 1 syl v. 2 syl phrase ........................................................ T6
   11. T1B-2 .................. 1 syl v. 2 syl phrase ........................................................ T6
   12. T1B-3 .................. 1 syl v. 2 syl phrase ........................................................ T6

Lesson Package: STRESS-2 ................................................................... T7

1. T2E-1 .................. 2 syl v. 5 syl sent ............................................................. T7
    2. T2E-2 .................. 2 syl v. 5 syl sent ............................................................. T7
    3. T2E-3 .................. 2 syl v. 5 syl sent ............................................................. T7
    4. T2D-1 .................. 2 syl v. 4 syl sent ............................................................. T8
    5. T2D-2 .................. 2 syl v. 4 syl sent ............................................................. T8
    6. T2D-3 .................. 2 syl v. 4 syl sent ............................................................. T8
    7. T2C-1 .................. 2 syl v. 3 syl sent ............................................................. T9
    8. T2C-2 .................. 2 syl v. 3 syl sent ............................................................. T9
    9. T2C-3 .................. 2 syl v. 3 syl sent ............................................................. T9

Stress Lessons
Attribute: Stress Pattern
Pattern Perception

Lesson Package: T-SCREEN

T1E-1
*1 syl v. 5 syl sent*

| | |
|---|---|
| small | Get the radio |
| laugh | Find the dogcatcher |
| drive | See the bakery |
| web | Buy the tricycle |
| swing | Wear the sunglasses |
| cane | I like bologna |
| queen | Get the eraser |
| game | Eat the banana |

T2E-1
*2 syl v. 5 syl sent*

| | |
|---|---|
| angel | Get the magazine |
| zebra | I like karate |
| beaver | See my handlebars |
| water | Watch the centipede |
| castle | Wear the suspenders |
| vampire | Eat the tomato |
| dipper | I want lemonade |
| tiger | See my limousine |

T3E-1
*3 syl v. 5 syl sent*

| | |
|---|---|
| butterfly | Get the envelope |
| icicle | See my chariot |
| sandpaper | I like celery |
| fingernail | See the pyramid |
| ladybug | Wear the suspenders |
| jewelry | Get the umbrella |
| overalls | Watch the buffalo |
| radio | See the Eskimo |

ITS - LISTENING LESSON MANUAL

Mixed Sentence
M Lesson Packages

Lesson Package: M-SCREEN ................................................................ M1

1. M1E-1 ................ 1 syl v. 5 syl sent ................................................ M1
2. M2E-1 ................ 2 syl v. 5 syl sent ................................................ M1
3. M3E-1 ................ 3 syl v. 5 syl sent ................................................ M1
4. MCE-1 ................ 3 syl sent v. 5 syl sent ........................................ M2
5. MDE-1 ................ 4 syl sent v. 5 syl sent ........................................ M2

Lesson Package: MIXSEN-1 ................................................................ M3

1. M1E-1 ................ 1 syl v. 5 syl sent ................................................ M3
2. M1E-2 ................ 1 syl v. 5 syl sent ................................................ M3
3. M1D-1 ................ 1 syl v. 4 syl sent ................................................ M3
4. M1D-2 ................ 1 syl v. 4 syl sent ................................................ M4
5. M1C-1 ................ 1 syl v. 3 syl sent ................................................ M4
6. M1C-2 ................ 1 syl v. 3 syl sent ................................................ M4
7. M1B-1 ................ 1 syl v. 2 syl phrase ............................................ M5
8. M1B-2 ................ 1 syl v. 2 syl phrase ............................................ M5
9. M1B-3 ................ 1 syl v. 2 syl phrase ............................................ M5
10. M1B-4 ................ 1 syl v. 2 syl phrase ............................................ M6
11. M1B-5 ................ 1 syl v. 2 syl phrase ............................................ M6

Lesson Package: MIXSEN-2 ................................................................ M7

1. M2E-1 ................ 2 syl v. 5 syl sent ................................................ M7
2. M2E-2 ................ 2 syl v. 5 syl sent ................................................ M7
3. M2D-1 ................ 2 syl v. 4 syl sent ................................................ M7
4. M2D-2 ................ 2 syl v. 4 syl sent ................................................ M8
5. M2C-1 ................ 2 syl v. 3 syl sent ................................................ M8
6. M2C-2 ................ 2 syl v. 3 syl sent ................................................ M8
7. M2B-1 ................ 2 syl v. 2 syl phrase ............................................ M9
8. M2B-2 ................ 2 syl v. 2 syl phrase ............................................ M9
9. M2B-3 ................ 2 syl v. 2 syl phrase ............................................ M9
10. M2B-4 ................ 2 syl v. 2 syl phrase ............................................ M10
11. M2B-5 ................ 2 syl v. 2 syl phrase ............................................ M10

| Mixed Words and Sentences Lessons
Attribute: Word 1, 2, 3
Words in Sentences |
|---|
| Lesson Package: M-SCREEN |

M1E-1
*1 syl v. 5 syl sent*

| | |
|---|---|
| goat | I like peppermint |
| hug | Watch the buffalo |
| white | Get the umbrella |
| leaf | See my piano |
| nut | Watch the butterfly |
| head | See the bakery |
| dream | Eat the hamburger |
| cat | Pet the kangaroo |

M2E-1
*2 syl v. 5 syl sent*

| | |
|---|---|
| puppet | Wear the jewelry |
| teacher | Get the newspaper |
| beaver | Watch the cardinal |
| saddle | See the factory |
| giraffe | See the restaurant |
| city | Eat the hamburger |
| finger | Watch the gorilla |
| zipper | See the library |

M3E-1
*3 syl v. 5 syl sent*

| | |
|---|---|
| furniture | I like karate |
| sunflower | Watch the somersault |
| oxygen | See my firecracker |
| cereal | Watch the woodpecker |
| dynamite | Get the feather |
| mechanic | See my limousine |
| laundromat | Watch the centipede |
| buttonhole | See the volcano |

Different Sentence
D Lesson Packages

Lesson Package: D-SCREEN ............................................................................. D1

1. DL11-1 ................ last wd, 1 syl v. 1 syl ........................................................ D1
2. DL22-1 ................ last wd, 2 syl v. 2 syl ........................................................ D1
3. DL33-5 ................ last wd, 3 syl v. 3 syl ........................................................ D1
4. DLV-1 ................. last wd, vowel v. vowel ..................................................... D2
5. DLI-1 .................. last wd, init con v. init con ................................................ D2
6. DLF-3 ................. last wd, final con v. final con ............................................. D2

Lesson Package: DIFSEN-1 ............................................................................. D3

1. DL11-1 ................ last wd, 1 syl v. 1 syl ........................................................ D3
2. DL11-2 ................ last wd, 1 syl v. 1 syl ........................................................ D3
3. DL11-3 ................ last wd, 1 syl v. 1 syl ........................................................ D3
4. DL11-4 ................ last wd, 1 syl v. 1 syl ........................................................ D4
5. DL11-5 ................ last wd, 1 syl v. 1 syl ........................................................ D4
6. DL11-6 ................ last wd, 1 syl v. 1 syl ........................................................ D4
7. DL11-7 ................ last wd, 1 syl v. 1 syl ........................................................ D5
8. DL11-8 ................ last wd, 1 syl v. 1 syl ........................................................ D5
9. DL11-9 ................ last wd, 1 syl v. 1 syl ........................................................ D5
10. DL11-10 ............. last wd, 1 syl v. 1 syl ........................................................ D6

Lesson Package: DIFSEN-2 ............................................................................. D7

1. DL22-1 ................ last wd, 2 syl v. 2 syl ........................................................ D7
2. DL22-2 ................ last wd, 2 syl v. 2 syl ........................................................ D7
3. DL22-3 ................ last wd, 2 syl v. 2 syl ........................................................ D7
4. DL22-4 ................ last wd, 2 syl v. 2 syl ........................................................ D8
5. DL22-5 ................ last wd, 2 syl v. 2 syl ........................................................ D8
6. DL33-1 ................ last wd, 3 syl v. 3 syl ........................................................ D8
7. DL33-2 ................ last wd, 3 syl v. 3 syl ........................................................ D9
8. DL33-3 ................ last wd, 3 syl v. 3 syl ........................................................ D9
9. DL33-4 ................ last wd, 3 syl v. 3 syl ........................................................ D9
10. DL33-5 ............... last wd, 3 syl v. 3 syl ...................................................... D10

ITS - LISTENING LESSON MANUAL

| Different Sentences Lessons<br>Attribute: Word 1, 2, 3<br>Words In Sentences | |
|---|---|
| Lesson Package: D-SCREEN | |
| DL11-1<br>*last wd, 1 syl v. 1 syl* | |
| I can tie<br>See my wrist | It is new<br>Watch the flame |
| See the knee<br>He is last | I can sew<br>You like pink |
| I want tea<br>See the ice | You can mow<br>Get the cone |
| See the jaw<br>It is strong | I like pie<br>Watch my eyes |
| DL22-1<br>*last wd, 2 syl v. 2 syl* | |
| I am afraid<br>Pet the zebra | It is rotten<br>See my guitar |
| I can juggle<br>Wear the helmet | See my cabin<br>It is winter |
| Eat the olive<br>I want honey | It is summer<br>See my rabbit |
| Eat the biscuit<br>Get the sandwich | See my valentine<br>It is purple |
| DL33-5<br>*last wd, 3 syl v. 3 syl* | |
| Eat the potato<br>Watch the cardinal | See my valentine<br>Get the radio |
| Get the eraser<br>I eat licorice | See my submarine<br>Wear the sunglasses |
| Get the telephone<br>Watch the woodpecker | Move his limousine<br>See the opposite |
| I want lemonade<br>Wear the galoshes | See the engineer<br>Get the hula-hoop |

ITS - LISTENING LESSON MANUAL

Same Sentence
S Lessons Packages

Lesson Package: S-SCREEN ........................................................................ S1

1. SL13-1 ................ last wd, 1 syl v. 3 syl .......................................... S1
    2. SL11-1 ................ last wd, 1 syl v. 1 syl .......................................... S1
    3. SL22-1 ................ last wd, 2 syl v. 2 syl .......................................... S1
    4. SL33-1 ................ last wd, 3 syl v. 3 syl .......................................... S2
    5. SLV-1 .................. last wd, vowel v. vowel ...................................... S2
    6. SLF-1 .................. last wd, final con v. final con ............................ S2

Lesson Package: SAMSEN-1 ....................................................................... S3

1. SL13-1 ................ last wd, 1 syl v. 3 syl .......................................... S3
    2. SL13-2 ................ last wd, 1 syl v. 3 syl .......................................... S3
    3. SL13-3 ................ last wd, 1 syl v. 3 syl .......................................... S3
    4. SL13-4 ................ last wd, 1 syl v. 3 syl .......................................... S4
    5. SL13-5 ................ last wd, 1 syl v. 3 syl .......................................... S4

Lesson Package: SAMSEN-2 ....................................................................... S5

1. SL11-1 ................ last wd, 1 syl v. 1 syl .......................................... S5
    2. SL11-2 ................ last wd, 1 syl v. 1 syl .......................................... S5
    3. SL11-3 ................ last wd, 1 syl v. 1 syl .......................................... S5
    4. SL11-4 ................ last wd, 1 syl v. 1 syl .......................................... S6
    5. SL11-5 ................ last wd, 1 syl v. 1 syl .......................................... S6
    6. SL11-6 ................ last wd, 1 syl v. 1 syl .......................................... S6
    7. SL11-7 ................ last wd, 1 syl v. 1 syl .......................................... S7
    8. SL11-8 ................ last wd, 1 syl v. 1 syl .......................................... S7
    9. SL11-9 ................ last wd, 1 syl v. 1 syl .......................................... S7
   10. SL11-10 ............. last wd, 1 syl v. 1 syl .......................................... S8

Lesson Package: SAMSEN-3 ....................................................................... S9

1. SL22-1 ................ last wd, 2 syl v. 2 syl .......................................... S9
    2. SL22-2 ................ last wd, 2 syl v. 2 syl .......................................... S9
    3. SL22-3 ................ last wd, 2 syl v. 2 syl .......................................... S9
    4. SL22-4 ................ last wd, 2 syl v. 2 syl ........................................ S10
    5. SL22-5 ................ last wd, 2 syl v. 2 syl ........................................ S10
    6. SL33-1 ................ last wd, 3 syl v. 3 syl ........................................ S10

| Same Sentences Lessons<br>Attribute: Word 1, 2, 3<br>Words in Sentences |
|---|
| Lesson Package: S-SCREEN |

SL13-1
*last wd, 1 syl v. 3 syl*

| | |
|---|---|
| Eat the bun | Eat the hamburger |
| Eat the nut | Eat the banana |
| | |
| Find the rope | Find the autograph |
| Find the cave | Find the triangle |
| | |
| Watch the moose | Watch the elephant |
| Watch the boat | Watch the butterfly |
| | |
| See the man | See the hospital |
| See the house | See the library |

SL11-1
*last wd, 1 syl v. 1 syl*

| | |
|---|---|
| See the jaw | See the ice |
| See the stone | See the globe |
| | |
| Watch my eyes | Watch my twin |
| Watch my snake | Watch my knee |
| | |
| See my wrist | See my jaw |
| See my plate | See my spoon |
| | |
| It is new | It is ice |
| It is green | It is flat |

SL22-1
*last wd, 2 syl v. 2 syl*

| | |
|---|---|
| Get the arrow | Get the ladder |
| Get the fossil | Get the teacher |
| | |
| I can button | I can juggle |
| I can vacuum | I can zigzag |
| | |
| Eat the biscuit | Eat the cherry |
| Eat the olive | Eat the sandwich |
| | |
| See the pedal | See the mummy |
| See the harpoon | See the jungle |

ITS - LISTENING LESSON MANUAL

Syllables in Words
Y Lesson Packages

Lesson Package: Y-SCREEN ................................................................ Y1

1. Y1L3H-1 ............. 1 syl, low freq v. 3 syl, high freq ....................................... Y1
    2. Y1L3L-1 ............. 1 syl, low freq v. 3 syl, low freq ........................................ Y1
    3. Y1H3H-1 ............ 1 syl, high freq v. 3 syl, high freq ...................................... Y1
    4. Y1H1L-1 ............. 1 syl, high freq v. 1 syl, low freq ....................................... Y2
    5. Y1L1L-1 ............. 1 syl, low freq v. 1 syl, low freq ........................................ Y2
    6. Y1L1L-1 ............. 1 syl, low freq v. 1 syl, low freq ........................................ Y2

Lesson Package: SYL123-1 ................................................................ Y3

1. Y1L3H-1 ............. 1 syl, low freq v. 3 syl, high freq ....................................... Y3
    2. Y1L3H-2 ............. 1 syl, low freq v. 3 syl, high freq ....................................... Y3
    3. Y1H3L-1 ............. 1 syl, high freq v. 3 syl, low freq ....................................... Y3
    4. Y1H3L-2 ............. 1 syl, high freq v. 3 syl, low freq ....................................... Y4
    5. Y1H2L-1 ............. 1 syl, high freq v. 2 syl, low freq ....................................... Y4
    6. Y1H2L-2 ............. 1 syl, high freq v. 2 syl, low freq ....................................... Y4
    7. Y1H2L-3 ............. 1 syl, high freq v. 2 syl, low freq ....................................... Y5
    8. Y1H2L-4 ............. 1 syl, high freq v. 2 syl, low freq ....................................... Y5
    9. Y1L2H-1 ............. 1 syl, low freq v. 2 syl, high freq ....................................... Y5
  10. Y1L2H-2 ............. 1 syl, low freq v. 2 syl, high freq ....................................... Y6
  11. Y1L2H-3 ............. 1 syl, low freq v. 2 syl, high freq ....................................... Y6
  12. Y2H3L-1 ............. 2 syl, high freq v. 3 syl, low freq ....................................... Y6
  13. Y2H3L-2 ............. 2 syl, high freq v. 3 syl, low freq ....................................... Y7
  14. Y2L3H-1 ............. 2 syl, low freq v. 3 syl, high freq ....................................... Y7
  15. Y2L3H-2 ............. 2 syl, low freq v. 3 syl, high freq ....................................... Y7

Lesson Package: SYL123-2 ................................................................ Y9

1. Y1B3B-1 ............. 1 syl, mixed freq v. 3 syl, mixed freq ................................. Y9
    2. Y1B3B-2 ............. 1 syl, mixed freq v. 3 syl, mixed freq ................................. Y9
    3. Y1B2B-1 ............. 1 syl, mixed freq v. 2 syl, mixed freq ................................. Y9
    4. Y1B2B-2 ............. 1 syl, mixed freq v. 2 syl, mixed freq ............................... Y10
    5. Y2B3B-1 ............. 2 syl, mixed freq v. 3 syl, mixed freq ............................... Y10
    6. Y2B3B-2 ............. 2 syl, mixed freq v. 3 syl, mixed freq ............................... Y10

| Syllables in Words Lessons<br>Attribute: Syllable 1, 2, 3<br>Syllables in Words ||
|---|---|
| Lesson Package: Y-SCREEN ||
| Y1L3H-1 <br> *1 syl, low freq v. 3 syl, high freq* ||
| robe | wastebasket |
| bear | parachute |
| drum | saxophone |
| nose | grasshopper |
| lamb | applesauce |
| mad | spaghetti |
| red | butterscotch |
| green | octopus |
| Y1L3L-1 <br> *1 syl, low freq v. 3 syl, low freq* ||
| ball | banana |
| drive | ambulance |
| jar | bulldozer |
| bowl | calendar |
| loud | valentine |
| mud | elephant |
| run | violin |
| zoo | ladybug |
| Y1H3H-1 <br> *1 syl, high freq v. 3 syl, high freq* ||
| cake | wastebasket |
| ice | applesauce |
| sleep | hospital |
| feet | dishwasher |
| peep | tricycle |
| key | parachute |
| sit | potato |
| lake | spaghetti |

ITS - LISTENING LESSON MANUAL

Consonants in Words
C Lesson Packages

Lesson Package: C-SCREEN ..................................................................................C1

1. CIV-1 .................... init con, voiced v. voiceless ............................................ C1
    2. CIM-1 .................. init con, manner v. manner ............................................. C1
    3. CIP-1 ................... init con, place v. place .................................................... C1
    4. CFV-1 .................. final con, voiced v. voiceless .......................................... C2
    5. CFM–1 ................ final con, manner v. manner .......................................... C2
    6. CFP-2 ................. final con, place v. place .................................................. C2

Lesson Package: CONSON-1 ................................................................................C3

1. CIV-1 .................... init con, voiced v. voiceless ............................................ C3
    2. CIM-1 .................. init con, manner v. manner ............................................. C3
    3. CIM-2 .................. init con, manner v. manner ............................................. C3
    4. CIM-3 .................. init con, manner v. manner ............................................. C4
    5. CIP–1 ................... init con, place v. place .................................................... C4
    6. CIP-2 ................... init con, place v. place .................................................... C4
    7. CIP-3 ................... init con, place v. place .................................................... C5
    8. CIP-4 ................... init con, place v. place .................................................... C5
    9. CIP-5 ................... init con, place v. place .................................................... C5
  10. CIP-6 ................... init con, place v. place .................................................... C6

Lesson Package: CONSON-2 ................................................................................C7

1. CFV-1 .................. final con, voiced v. voiceless .......................................... C7
    2. CFM-1 ................. final con, manner v. manner .......................................... C7
    3. CFM-2 ................. final con, manner v. manner .......................................... C7
    4. CFM-3 ................. final con, manner v. manner .......................................... C8
    5. CFP-1 ................. final con, place v. place .................................................. C8
    6. CFP-2 ................. final con, place v. place .................................................. C8
    7. CFP-3 ................. final con, place v. place .................................................. C9
    8. CFP-4 ................. final con, place v. place .................................................. C9

Consonants in Words Lessons
Attribute: Phoneme 1, 2, 3
Features in Words

Lesson Package: C-SCREEN

CIV-1
*init con, voiced v. voiceless*

| | |
|---|---|
| bale | pail |
| dime | time |
| | |
| van | fan |
| zip | sip |
| | |
| vase | face |
| bat | pat |
| | |
| beak | peek |
| dip | tip |

CIM-1
*init con, manner v. manner*

| | |
|---|---|
| mad | bad |
| mail | bale |
| | |
| mat | bat |
| meat | beet |
| | |
| mole | bowl |
| mud | bud |
| | |
| mug | bug |
| moat | boat |

CIP-1
*init con, place v. place*

| | |
|---|---|
| meat | neat |
| mice | nice |
| | |
| moon | noon |
| map | nap |
| | |
| ball | doll |
| big | dig |
| | |
| boat | goat |
| bun | gun |

Vowel
V Lesson Packages

Lesson Package: V-SCREEN .................................................................. V1

1. VHBDMF-1 ......... high back vowel v. mid front dipthong ............................ V1
    2. VHFDMC-1 ......... high front vowel v. mid central dipthong ......................... V1
    3. VHBDLF-1 .......... high back vowel v. low front dipthong .............................. V1
    4. VHBVHF-7 .......... high back vowel v. high front vowel ................................ V2
    5. VLBDMF-1 .......... low back vowel v. mid front dipthong .............................. V2
    6. VHBVHB-1 .......... high back vowel v. high back vowel ................................ V2

Lesson Package: VOWEL-1 ..................................................................... V3

1. VHBDMF-1 ......... high back vowel v. mid front dipthong ............................ V3
    2. VHBDMF-2 ......... high back vowel v. mid front dipthong ............................ V3
    3. VHFDMB-1 ......... high front vowel v. mid back dipthong ............................ V3
    4. VHFDMB-2 ......... high front vowel v. mid back dipthong ............................ V4
    5. VHBDMC-1 ......... high back vowel v. mid central dipthong ......................... V4
    6. VHBVMC-1 ......... high back vowel v. mid central vowel .............................. V4
    7. VHFDMC-1 ......... high front vowel v. mid central dipthong ......................... V5
    8. VHFDMC-2 ......... high front vowel v. mid central dipthong ......................... V5
    9. VHFDMF-1 .......... high front vowel v. mid front dipthong ............................ V5
   10. VHFDMF-2 .......... high front vowel v. mid front dipthong ............................ V6
   11. VHBDMB-1 ......... high back vowel v. mid back dipthong ............................ V6
   12. VHBDMB-2 ......... high back vowel v. mid back dipthong ............................ V6

Lesson Package: VOWEL-2 ..................................................................... V7

1. VHBDLF-1 .......... high back vowel v. low front dipthong .............................. V7
    2. VHBDLF-2 .......... high back vowel v. low front dipthong .............................. V7
    3. VHFVLB-1 .......... high front vowel v. low back vowel ................................. V7
    4. VHFVLB-2 .......... high front vowel v. low back vowel ................................. V8
    5. VHFVLB-3 .......... high front vowel v. low back vowel ................................. V8
    6. VHBVHF-1 .......... high back vowel v. high front vowel ................................ V8
    7. VHBVHF-2 .......... high back vowel v. high front vowel ................................ V9
    8. VHBVHF-3 .......... high back vowel v. high front vowel ................................ V9
    9. VHBVHF-4 .......... high back vowel v. high front vowel ................................ V9
   10. VHBVHF-5 .......... high back vowel v. high front vowel .............................. V10
   11. VHBVHF-6 .......... high back vowel v. high front vowel .............................. V10
   12. VHBVHF-7 .......... high back vowel v. high front vowel .............................. V10

ITS - LISTENING LESSON MANUAL

| Vowels in Words Lessons<br>Attribute: Phoneme 1, 2, 3<br>Features in Words |
|---|
| Lesson Package: V-SCREEN |
| VHBDMF-1<br>*high back vowel v. mid front dipthong*<br><br>food                rain<br>boot                cake<br><br>moon             day<br>juice               wake<br><br>zoo                 cage<br>goose            rake<br><br>groom            break<br>pool               plane |
| VHFDMC-1<br>*high front vowel v. mid central dipthong*<br><br>green             white<br>sneeze           cry<br><br>feet                night<br>teeth             eyes<br><br>leaf                knife<br>cheese           bike<br><br>read               dive<br>wheel             kite |
| VHBDLF-1<br>*high back vowel v. low front dipthong*<br><br>goose            cat<br>pool                bath<br><br>shoe              hat<br>blue               black<br><br>food               bat<br>glue               man<br><br>moon             sad<br>broom           laugh |

ITS - LISTENING LESSON MANUAL

ATTRIBUTE PRESENTATIONS

Phoneme 1.....the first phoneme of the first syllable in a word

Phoneme 2.....the second phoneme of the first syllable in a word

Phoneme 3.....the third phoneme of the first syllable in a word

Syllable 1....the first syllable of a word, or the first syllable of the first word in a phrase/sentence Syllable 2....the second syllable of a word, or the second syllable of the first word in a phase/sentence Syllable 3....the third syllable of a word, or the third syllable of the first word in a phase/sentence Word 1........first word in a word/phrase or sentence Word 2........second word in a phrase or sentence Word 3........third word in a phrase/sentence Synonym.......a word or phrase with the same meaning Antonym.......a word or phrase with the opposite meaning Speech/Non....a descriptor showing whether the stimuli is speech or an environmental sound Duration......this display shows the length of the stimuli, it is derived from the number of phonemes and/or the number of environmental descriptors in a stimuli Syllable #....total number of syllables in a word/sentence... taken from the phonetic text Stress Pat....taken from syllabic stress information in the phonetic text
         ^   represents primary stress
         ^^  represents secondary stress
         ^^^ represents tertiary stress Semantic......a language based category related to the meaning of the words

```
                              Audio Library Editor
Main Menu

F2    Support libraries menu
F3    Create/edit users
F4    Lesson components menu
F10   Exit editor Support Libraries Menu F2    Create/edit an audio library
      F3    Create/edit a picture library
      F4    Create/edit a stimuli library
      F10   Exit to previous menu Audio Library Editor F2    Load library
            F3    Create library
            F4    Add/edit menu
            F5    Set group for library
            F7    Examine entries
            F8    Print library
            F9    Save library
            F10   Exit to previous F2    Load library Open an Audio Library
                  Which Audio directory?
                  G) eneric
                  L) anguage
                  S) ite Open an Audio Library
                  Please select the library to load.
                  Path: I:\ITS\LIBS\GENERIC
                  Filename: *.ALB Open an Audio Library
                  1     ALB   1862254  10/06/92   4:32P
                  2     ALB   1889447  10/07/92  12:04P F3    Create library Create an Audio library
                  Which Audio directory?
                  G) eneric
                  L) anguage
                  S) ite Create an Audio Library
                  Please select the Audio library name.
                  Path: I:\ITS\LIBS\GENERIC
                  Filename: *.ALB F4    Add/edit menu Add/Edit Menu
                  F2    Add entry
                  F3    Export entry
                  F6    Delete entry
                  F7    Examine entries
                  F8    Rename entry
                  F10   Exit to previous Select files from the specified library for each of these
                        functions by selecting and tagging from the library
```

*Appendix B*                                                                    *B1*

```
F5    Set group for library
          Mark this library as belonging to a group.
          Library Group: 0

F7    Examine entries

F8    Print library
          Print Picture lib to printer or file
          Do you want the output to go to a file? (Y/N)?

Print Picture lib to printer or file
          Please enter an output file name.
          Path:
          Filename:

F9    Save library
          Close Picture library
          Please select a filename to write the library to.
          Path:
          Filename:
```

```
                        Picture Library Editor
Main Menu

F2    Support libraries menu
F3    Create/edit users
F4    Lesson components menu
F10   Exit editor Support Libraries Menu F2    Create/edit an audio library
      F3    Create/edit a picture library
      F4    Create/edit a stimuli library
      F10   Exit to previous menu Picture Library Editor F2    Load library
            F3    Create library
            F4    Add/edit menu
            F5    Set group for library
            F7    Examine entries
            F8    Print library
            F9    Save library
            F10   Exit to previous F2    Load library Open an Picture Library
                  Which Picture directory?
                  G) eneric
                  L) anguage
                  S) ite Open an Picture Library
                  Please select the library to load.
                  Path: I:\ITS\LIBS\GENERIC
                  Filename: *.PLB Open an Picture Library
                  1     PLB  670050  03/06/92  4:32P
                  2     PLB  894407  03/07/92  12:04P F3    Create library Create a Picture library
                  Which Picture directory?
                  G) eneric
                  L) anguage
                  S) ite Create an Picture Library
                  Please select the Picture library name.
                  Path: I:\ITS\LIBS\GENERIC
                  Filename: *.PLB F4    Add/edit menu Add/Edit Menu
                  F2    Add entry
                  F3    Export entry
                  F6    Delete entry
                  F7    Examine entries
                  F8    Rename entry
                  F10   Exit to previous Select files from the specified library for
                        each of these functions by selecting and
                        tagging from the library
```

```
       F7    Export carriers via list

Export a carrier list
             @EATTHEBISCUIT
             @EATTHEBREAD
             @EATTHECHERRY
             @EATTHEFRUIT Export a carrier list
             Please enter an output file name.
             Path:
             Filename:

F5   Set group for library

Mark this library as belonging to a group.
     Library Group: 0

F7   Examine entries

List Stimuli library
     @EATTHEBISCUIT (Can INS to view entry)
     @EATTHEBREAD
     @EATTHECHERRY
     @EATTHEFRUIT F8   Print library Print Stimuli lib to printer or file
     Do you want the output to go to a file? (Y/N)?

Print Stimuli lib to printer or file
     Please enter an output file name.
     Path:
     Filename:

F9   Save library

Close Stimuli library
     Please select a filename to write the library to.
     Path:
     Filename:
```

*B4*

F2  Add entries via list

Insert entries from a text file
    Please select the name list to use.
    Path:
    Filename:

Insert entries from a text file
    1%250 CA    4567  10/13/92  12:22A
    1&    CS    1156  12/22/91  10:02P
    1     CS    6689  06/12/92  07:11P F3  Add complex via list Insert complex entries from a text file
    Please select the name list to use.
    Path:
    Filename:

Insert complex entries from a text file
    1%250 CA    4567  10/13/92  12:22A
    1&    CS    1156  12/22/91  10:02P
    1     CS    6689  06/12/92  07:11P F4  Add carriers via list Insert carrier entries from a text file
    Please select the name list to use.
    Path:
    Filename:

Insert carrier entries from a text file
    1%250 CA    4567  10/13/92  12:22A
    1&    CS    1156  12/22/91  10:02P
    1     CS    6689  06/12/92  07:11P F5  Export entry list Export an entry list
    BAY
    BEE
    BLACK
    BLEED Export an entry list
    Please enter an output file name.
    Path:
    Filename:

F6  Export complex list

Export a complex list
    &BEEHIVE
    &BIGBEAR
    &BIGBOX
    &BIGBULL

Export a complex list
    Please enter an output file name.
    Path:
    Filename:

```
F5    Edit entry

Edit a Stimuli entry
            @EATTHEBEET
            @EATTHEBREAD
            @EATTHEFRUIT
            @EATTHEGRAPE Edit a carrier entry
            Carrier entry: @EATTHEBREAD
            Please select the carrier audio entry
            Audio: &EATHEBREAD
            Picture: BREAD
            Element 1: EAT
            Element 2: THE
            Element 3: BREAD
            Element 4:
            Element 5:
            Element 6:
            Element 7:
            Element 8:
            Element 9:
            Element 10:

F6    Delete entry

Delete a Stimuli entry
            @EATTHEBEET
            @EATTHEBREAD
            @EATTHEFRUIT
            @EATTHEGRAPE F7    Examine entries List Stimuli library
            @EATTHEBEET   (Press INS to review entry)
            @EATTHEBREAD
            @EATTHEFRUIT
            @EATTHEGRAPE F8    Rename entries Rename a Stimuli entry
            @EATTHEBEET
            @EATTHEBREAD
            @EATTHEFRUIT
            @EATTHEGRAPE Rename a Stimuli entry
            Old entry name: @EATTHEBREAD
            New name of entry: @EATTHECRUST F9    List load/save List Load/Save Menu F2    Add entries via list
            F3    Add complex via list
            F4    Add carrier entry via list
            F5    Export entry list
            F6    Export complex list
            F7    Export carriers via list
            F10   Exit to previous
```

*B6*

F4    Add/edit menu

Add/Edit Menu
      F2    Add entry
      F3    Add complex audio
      F4    Add carrier entry
      F5    Edit entry
      F6    Delete entry
      F7    Examine entries
      F8    Rename entry
      F9    List load/save
      F10   Exit to previous F2    Add entry Add an entry
                  Name of entry:

Add an entry
                  Entry: BEET
                        Please select an audio entry.
                  Audio:
                  Picture:
                  Text:
                  Phonetic Text:
                  English Text:

F3    Add complex audio

Add a complex audio entry
                  Name of entry: &

Add a complex audio entry
                  Name of entry: &EATTHEBEET
                        Please select an element one entry.
                  Element 1:
                  Element 2:
                  Element 3:
                  Element 4:
                  Element 5:
                  Element 6:
                  Element 7:
                  Element 8:
                  Element 9:
                  Element 10:
                  Element 11:
                  Element 12:

F4    Add a carrier entry

Add a carrier entry
                  Name of entry: @

Add a carrier entry
                  Carrier entry: @EATTHEBEET
                        Please select the carrier audio entry.
                  Element 1:
                  Element 2:
                  Element 3:
                  Element 4:
                  Element 5:
                  Element 6:
                  Element 7:
                  Element 8:
                  Element 9:
                  Element 10:

Stimuli Library
Main Menu

F2   Support libraries menu
F3   Create/edit users
F4   Lesson components menu
F10  Exit editor Support Libraries Menu F2   Create/edit an audio library
    F3   Create/edit a picture library
    F4   Create/edit a stimuli library
    F10  Exit to previous menu Stimuli Library Editor F2   Load library
        F3   Create library
        F4   Add/edit menu
        F5   Set group for library
        F7   Examine entries
        F8   Print library
        F9   Save library
        F10  Exit to previous F2   Load library Open a Stimuli Library
                Which Stimuli directory?
                G) eneric
                L) anguage
                S) ite Open a Stimuli Library
                Please select the stimuli library to load.
                Path: I:\ITS\LIBS\GENERIC
                Filename: *.SLB Open a Stimuli Library
                1%250 SLB   30928  12/02/92   4:32P
                1&    SLB   45998  11/23/92  12:04P F3   Create library Create a Stimuli library
                Which Stimuli directory?
                G) eneric
                L) anguage
                S) ite Create a Stimuli Library
                Please select the stimuli library name.
                Path: I:\ITS\LIBS\GENERIC
                Filename: *.SLB F5   Set group for library Mark this library as belonging to a group.
      Library Group: 0

F7   Examine entries

F8   Print library

Print Audio lib to printer or file
      Do you want the output to go to a file? (Y/N)?

Print Audio lib to printer or file
      Please enter an output file name.
      Path:
      Filename:

F9   Save library

Close Audio library
      Please select a filename to write the library to.
      Path:
      Filename:

Lesson Components Editor

Main Menu

F2    Support libraries menu
F3    Create/edit users
F4    Lesson components menu
F10   Exit editor Lesson Components Menu F2    Create/edit AV levels
      F3    Create/edit AV level sets
      F4    Create/edit attribute sets
      F5    Create/edit strategies
      F6    Create/edit lessons
      F7    Create/edit lesson packages
      F8    Create/edit wordlists
      F10   Exit to previous menu <u>F2-AV level Editor</u>

F2    Create AV level file
          F3    Select AV level file
          F4    Discrimination AV levels
          F5    Identification AV levels
          F10   Exit to previous F2    Create AV level file AV level Editor
                Please enter the name of the new file.
                Path:
                Filename:

F3    Select AV level file

AV level Editor
                (Menu listing)

F4    Discrimination AV levels

Discrimination AV levels

F4    Add AV level
              F5    Edit AV level
              F6    Delete AV level
              F7    List AV levels
              F10   Exit to previous F4    Add AV level Do you want to copy and existing Av level? (Y/N)?

Edit discrimination task parameters
                    Responses      Yes    Yes    Yes    Yes
                    Show picture   None   None   None   None
                    Audio          Always Always Always Always
                    Text           On demand None None None

```
F5      Edit AV level

Edit AV level
                (Menu listing)

Edit discrimination task parameters
                AV level:
                Responses       Yes    Yes    Yes    Yes
                Show picture    None   None   None   None
                Audio           Always Always Always Always
                Text            On demand None None None F6      Delete AV level
                (Menu listing)

F7      List AV levels (Menu listing)

F5  Identification AV levels

Identification AV levels

F4      Add AV level
F5      Edit AV level
F6      Delete AV level
F7      List AV levels
F10     Exit to previous F4      Add AV level Do you want to copy and existing AV level? (Y/N)?

Edit matching task parameters
                STIMULI             Yes    Yes    Yes    Yes
                Stimuli picture     None   None   None   None
                Stimuli audio       Always Always Always Always
                Stimuli text        On demand None None None
                RESPONSES           Yes    Yes    Yes    Yes
                Response picture    None   None   None   None
                Response audio      Always Always Always Always
                Response text       On demand None None None F5      Edit AV level Edit AV level
                (Menu listing)

Edit identification task parameters
                AV level: 1
                Edit matching task parameters
                STIMULI             Yes    Yes    Yes    Yes
                Stimuli picture     None   None   None   None
                Stimuli audio       Always Always Always Always
                Stimuli text        On demand None None None
                RESPONSES           Yes    Yes    Yes    Yes
                Response picture    None   None   None   None
                Response audio      Always Always Always Always
                Response text       On demand None None None F6      Delete AV level (Menu listing)

F7      List AV levels (Menu listing)
```

*B/11*

F3-AV level set Editor

F2    Create AV level set file
F3    Select AV level set file
F4    Discrimination AV level sets
F5    Identification AV level sets
F10   Exit to previous F2    Create AV level set file AV level Editor
       Please enter the name of the new file.
       Path:
       Filename:

F3    Select AV level set file

AV level Editor
       (Menu listing)

F4    Discrimination AV level sets

Discrimination AV level sets

F4    Add AV level set
       F5    Edit AV level set
       F6    Delete AV level set
       F7    List AV level sets
       F10   Exit to previous F4    Add AV level set Do you want to copy and existing AV level set
            (Y/N)?

Least difficult AV level:
            AV level:
            AV level:
            AV level:
            AV level:
            AV level:
            AV level:
            Most difficult AV level:

F5    Edit AV level set

Edit AV level set
            Name  Description

AV level set:

Least difficult AV level:
            AV level:
            AV level:
            AV level:
            AV level:
            AV level:
            AV level:
            Most difficult level:

F6    Delete AV level set

Name  Description

F7    List AV level sets

Name  Description

```
F5      Identification AV level sets
        Identification AV level sets

F4      Add AV level set
        F5      Edit AV level set
        F6      Delete AV level set
        F7      List AV level sets
        F10     Exit to previous F4      Add AV level set Do you want to copy and existing Av level set?
                (Y/N)?

Least difficult AV level:
                AV level:
                AV level:
                AV level:
                AV level:
                AV level:
                AV level:
                Most difficult level:

F5      Edit AV level set

Edit AV level set
                Name    Description

F6      Delete AV level set
                Name    Description

F7      List AV level sets

Name    Description
```

F4-Create/edit attribute sets

```
F2      Create attribute set file
F3      Select attribute set file
F4      Add attribute set
F5      Edit attribute set
F6      Delete attribute set
F7      List Attribute set
F10     Exit to previous F2      Attribute set editor
                Enter the name of the new file
                Path:
                Filename:

F3      Select attribute set file

F4      Add attribute set
                Window 1 attribute:
                Window 2 attribute:
                Window 3 attribute:
                Window 4 attribute:

F5      Edit attribute set
                Length          Length
                Nonspeech       Nonspeech
                Phoneme         Phoneme
                Stress          Stress
                Syl123          Syllable 123
                Sylinsent       Syllables in sentences
                Sylnum          Syllable number
                Word 123        Word 123
                        ...
```

F5-Create/edit strategies

```
F2    Create strategy file
F3    Select strategy file
F4    Discrimination strategies
F5    Identification strategies
F10   Exit to previous F2    Strategy editor
      Enter the name of the new file
      Path:
      Filename:

F3    Select strategy file
            Listing of existing files

F4    Discrimination strategies

F4    Add strategy
            F5    Edit strategy
            F6    Delete strategy
            F7    List strategies
            F10   Exit to previous F4    Add a discrimination strategy Lesson AVL Set:
                        Maximum Groups to Use:
                        Starting Group:

Action on Task Success:
                        Action on Task Failure:

AV Level of Next group on test
                          success relative to starting AV
                          level:

AV Level of Next group on test
                          failure relative to starting AV
                          level:

Task Failures to Previous lesson:
                        Task Success to next lesson:
                        Failure Criterion:
                        Success Criterion:

F5    Edit Strategy
                        Name  Description

F6    Delete Strategy
                        Name  Description

F7    List Strategies
                        Name  Description

F5    Identification strategies

F4    Add strategy
            F5    Edit strategy
            F6    Delete strategy
            F7    List strategies
            F10   Exit to previous
```

F4   Add an identification strategy

Lesson AVL Set:
    Maximum Groups to Use:
    Starting Group:

Action on Task Success:
    Action on Task Failure:

AV Level of Next group on test success relative to starting AV level:

AV Level of Next group on test failure relative to starting AV level:

Task Failures to Previous lesson:
    Task Success to next lesson:
    Failure Criterion:
    Success Criterion:

F5   Edit Strategy
    Name   Description

F6   Delete Strategy
    Name   Description

F7   List Strategies
    Name Description

F6-Create/edit lessons

```
F2    Create lesson file
F3    Select lesson file
F4    Add lesson
F5    Edit lesson
F6    Delete lesson
F7    List lessons
F10   Exit to previous
```

F2   Lesson Editor
        Enter the name of the new file
        Path:
        Filename:

F3   Select lesson (Select from menu options)

F4   Add lesson (See user default screen)

F5   Edit lesson
        Name   Description (Select/tag and edit)

F6   Delete lesson
        Name   Description (Select/tag and delete)

F7   List lesson
        Name   Description (Menu listing)

F7-Create/edit lesson packages

```
F2    Create lesson package file
F3    Select lesson package file
F4    Add lesson package
F5    Edit lesson package
F6    Delete lesson package
F7    List lesson packages
F10   Exit to previous
```

F2  Lesson Editor
    Enter the name of the new file
    Path:
    Filename:

F3  Lesson Package (Select from menu options)

F4  Add lesson package

Lesson 01:
    Lesson 02:
    Lesson 03:
    Lesson 04:
    Lesson 05:
    Lesson 06:
    Lesson 07:
    Lesson 08:
    Lesson 09:
    Lesson 10:
    Lesson 11:
    Lesson 12:
    Lesson 13:
    Lesson 14:
    Lesson 15:

F5  Edit lesson package

Name  Description listed (Select from menu)

F6  Delete lesson package
    Name  Description (Select/tag and delete)

F7  List lesson package
    Name  Description (Menu listing)

F8-Create/edit wordlists

Edit Wordlist

Title:

Set 1:          Set 2:
Set 3:          Set 4:

Contrast Set 1  Contrast Set 2  Contrast Set 3  Contrast Set 4

(Load wordlists by pressing F5;
 Pull from libraries by pressing F2;
 Select libraries by pressing F3;)

*B 16*

```
                              User Editor
Main Menu

F2      Support libraries menu
F3      Create/edit users
F4      Lesson components menu
F10     Exit editor User editor F2      Create user file
        F3      Select user file
        F4      Add user
        F5      Edit user
        F6      Delete user
        F7      View users
        F10     Exit to menu F2      Create user file Please enter the name of the new file.
                Path:
                Filename:

F3      Select user file

Select user file
                PRESCHOOL
                KINDER-1
                1ST-GRADE
                STANDARD F4      Add user Edit a user
                Do you want to copy an existing User (Y/N)?

User ID:

Edit a user
                User ID:
                Name:
                Birthdate: 01/01/00
                Group:
                Output device:
                Report Dir:
                Current Lesson:   User Defaults:   Lessons:
                Feedback:   Tasks to Feedback:
                Puzzle Feedback Before Painting:   Painting Time Allowed in
                                                                  Seconds:
                Any Try OK:   Magic:

F5      Edit a User

F6      Delete user

ABBY
                ALICE
                BRYCE
                DANIEL

Delete user
                Are you sure you want to delete XX (Y/N)?

F7      View users

List users
                ABBY
                BRYCE
                DANIEL
```

*B17*

What is claimed is:

1. A system for adaptive learning by an individual user comprising:
- a memory device containing data relating to:
  - user instructions,
  - normative responses, and
  - selection presentations;
- a control device containing the memory device and a processor;
- a user interface including a user perceivable display, a stimuli presentation device, and a tactile selection and input device; and
- a software program which includes processing steps to facilitate adaptive learning, the program further comprising:
  - presenting stimuli to the user through at least one of the stimuli presentation device and the user perceivable display of the user interface, the stimuli presentation device comprising a device which transduces an electrical signal input to the system representing sound into at least one of an actual sound, an analog signal to stimulate a cochlear implant, and an actuation electrical signal to actuate a vibrotactile device,
  - reading user input in response to said stimuli,
  - selecting succeeding stimuli based on both a comparison of user responses and normative data and upon a classification of the user responses irrespective of normative data.

* * * * *